US012035875B2

(12) United States Patent
Conrad

(10) Patent No.: US 12,035,875 B2
(45) **Date of Patent: *Jul. 16, 2024**

(54) ALL IN THE HEAD SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,888

(22) Filed: Apr. 11, 2023

(65) Prior Publication Data

US 2023/0248200 A1 Aug. 10, 2023

Related U.S. Application Data

(63) Continuation of application No. 17/504,147, filed on Oct. 18, 2021, now Pat. No. 11,672,397, which is a (Continued)

(51) Int. Cl.
*A47L 9/32* (2006.01)
*A47L 5/22* (2006.01)
(Continued)

(52) U.S. Cl.
CPC ............... *A47L 9/322* (2013.01); *A47L 5/225* (2013.01); *A47L 5/30* (2013.01); *A47L 5/32* (2013.01); *A47L 5/365* (2013.01); *A47L 9/0018* (2013.01); *A47L 9/0411* (2013.01); *A47L 9/16* (2013.01); *A47L 9/1608* (2013.01);
(Continued)

(58) Field of Classification Search
CPC . A47L 9/322; A47L 5/225; A47L 5/30; A47L 5/32; A47L 5/365; A47L 9/0018; A47L 9/0411; A47L 9/16; A47L 9/1608; A47L 9/1666; A47L 9/1683;
(Continued)

(56) References Cited

U.S. PATENT DOCUMENTS 5,309,600 A 5/1994 Weaver
5,500,979 A 3/1996 Worwag
(Continued)

FOREIGN PATENT DOCUMENTS

CA 2192906 7/1997
CA 2192909 7/1997
(Continued)

OTHER PUBLICATIONS

International Search Report and Written Opinion, International Application No. PCT/CA2015/051331, mailed on Mar. 3, 2016.

*Primary Examiner* — David Redding
(74) *Attorney, Agent, or Firm* — Philip C. Mendes da Costa; BERESKIN & PARR LLP/S.E.N.C.R.L. s.r.l.

(57) ABSTRACT

A vacuum cleaner has a portable cleaning unit that is removably mounted to the surface cleaning head. The vacuum cleaner is operable in a floor cleaning configuration in which the portable cleaning unit is mounted to the surface cleaning head and is part of the air flow path through the vacuum cleaner. The portable cleaning unit is also useable in a portable cleaning configuration in which the portable cleaning unit is removed from the surface cleaning head.

20 Claims, 11 Drawing Sheets

Related U.S. Application Data continuation of application No. 16/407,339, filed on May 9, 2019, now Pat. No. 11,202,544, which is a continuation of application No. 15/254,072, filed on Sep. 1, 2016, now Pat. No. 10,357,136, which is a continuation-in-part of application No. 14/829,331, filed on Aug. 18, 2015, now Pat. No. 10,022,027, which is a continuation of application No. 14/573,549, filed on Dec. 17, 2014, now Pat. No. 9,717,383.

(51) Int. Cl.

| | |
|---|---|
| ***A47L 5/30*** | (2006.01) |
| ***A47L 5/32*** | (2006.01) |
| ***A47L 5/36*** | (2006.01) |
| ***A47L 9/00*** | (2006.01) |
| ***A47L 9/04*** | (2006.01) |
| ***A47L 9/16*** | (2006.01) |
| ***A47L 9/22*** | (2006.01) |
| ***A47L 9/28*** | (2006.01) |
| ***B25G 1/04*** | (2006.01) |

(52) U.S. Cl.

CPC ........... *A47L 9/1666* (2013.01); *A47L 9/1683* (2013.01); *A47L 9/1691* (2013.01); *A47L 9/22* (2013.01); *A47L 9/2878* (2013.01); *A47L 9/2884* (2013.01); *A47L 9/325* (2013.01); *A47L 9/327* (2013.01); *B25G 1/04* (2013.01)

(58) Field of Classification Search

CPC ........ A47L 9/1691; A47L 9/22; A47L 9/2878; A47L 9/2884; A47L 9/325; A47L 9/327; B25G 1/04

See application file for complete search history.

(56) References Cited

U.S. PATENT DOCUMENTS

| | | | | |
|---|---|---|---|---|
| 5,671,499 | A | 9/1997 | Melito et al. | |
| 5,699,586 | A | 12/1997 | Melito et al. | |
| 5,765,258 | A | 6/1998 | Melito et al. | |
| 5,909,755 | A | 6/1999 | Leal | |
| 6,012,200 | A | 1/2000 | Murphy et al. | |
| 6,221,134 | B1 | 4/2001 | Conrad | |
| 6,317,920 | B1 | 11/2001 | Brickner et al. | |
| 6,345,411 | B1 | 2/2002 | Kato | |
| 6,442,792 | B1 | 9/2002 | Sudou et al. | |
| 6,817,059 | B2 | 11/2004 | Tsuchiya | |
| D507,387 | S | 7/2005 | Jacobs | |
| 7,013,528 | B2 | 3/2006 | Parker et al. | |
| 7,222,393 | B2 | 5/2007 | Kaffenberger | |
| 7,251,854 | B2 | 8/2007 | Gerth et al. | |
| 7,329,294 | B2 | 2/2008 | Conrad | |
| 7,996,957 | B2 | 8/2011 | Kah, Jr. | |
| 8,020,251 | B2 | 9/2011 | Luebbering et al. | |
| 8,268,029 | B2 | 9/2012 | Yoo | |
| 9,119,511 | B2 | 9/2015 | Kah | |
| 11,202,544 | B2 * | 12/2021 | Conrad | A47L 5/225 |
| 11,672,397 | B2 * | 6/2023 | Conrad | A47L 9/2884 15/329 |
| 2004/0134026 | A1 | 7/2004 | Brinkhoff et al. | |
| 2005/0115409 | A1 | 6/2005 | Conrad | |
| 2006/0156509 | A1 | 7/2006 | Luebbering et al. | |
| 2006/0196004 | A1 | 9/2006 | Conrad | |
| 2006/0288520 | A1 | 12/2006 | Oh | |
| 2008/0178420 | A1 | 7/2008 | Conrad | |
| 2009/0056060 | A1 | 3/2009 | Han et al. | |
| 2010/0229337 | A1 | 9/2010 | Conrad | |
| 2013/0291333 | A1 | 11/2013 | Grey | |
| 2014/0165313 | A1 | 6/2014 | Hicke | |
| 2014/0237753 | A1 | 8/2014 | Conrad | |
| 2014/0245564 | A1 | 9/2014 | Conrad | |
| 2015/0135474 | A1 | 5/2015 | Gidwell | |

FOREIGN PATENT DOCUMENTS

| | | |
|---|---|---|
| CA | 2192883 | 12/1997 |
| CA | 2276796 | 1/2000 |
| CA | 2374961 | 11/2001 |
| CA | 2391177 | 12/2002 |
| CA | 2391180 | 12/2002 |
| CA | 2603508 | 10/2006 |
| CA | 2706562 | 5/2009 |
| CA | 2806339 | 2/2012 |
| CA | 2821234 | 6/2012 |
| GB | 2419276 B | 8/2007 |

* cited by examiner

ALL IN THE HEAD SURFACE CLEANING APPARATUS

CROSS-REFERENCE TO RELATED APPLICATIONS

This application is a continuation of U.S. patent application Ser. No. 17/504,147, filed on Oct. 18, 2021, now allowed, which is a continuation of U.S. patent application Ser. No. 16/407,339, filed on May 9, 2019, and issued as U.S. Pat. No. 11,202,544 on Dec. 21, 2021, which is a continuation of U.S. patent application Ser. No. 15/254,072, filed on Sep. 1, 2016 and issued as U.S. Pat. No. 10,357,136 on Jul. 23, 2019, which itself is a continuation-in-part of co-pending U.S. patent application Ser. No. 14/829,331, which was filed on Aug. 18, 2015 and issued as U.S. Pat. No. 10,022,027 on Jul. 17, 2018, which is a continuation-in-part of co-pending U.S. patent application Ser. No. 14/573,549, which was filed on Dec. 17, 2014 and issued as U.S. Pat. No. 9,717,383 on Aug. 1, 2017, which are incorporated herein in their entirety by reference.

FIELD

This disclosure relates generally to surface cleaning apparatus, including all in the head type surface cleaning apparatus.

BACKGROUND

Various types of surface cleaning apparatus are known. These include upright surface cleaning apparatus, canister surface cleaning apparatus, stick surface cleaning apparatus and central vacuum systems. Typically, a surface cleaning apparatus has a surface cleaning head with an inlet. For example, an upright surface cleaning apparatus typically comprises an upright section containing at least an air treatment member that is pivotally mounted to a surface cleaning head. A canister surface cleaning apparatus typically comprises a canister body containing at least an air treatment member and a suction motor that is connected to a surface cleaning head by a flexible hose and a handle. Such designs are advantageous as they permit some of the operating components, and optionally all of the operating components (i.e., the suction motor and the air treatment members) to be placed at a location other than the surface cleaning head. This enables the surface cleaning head to be lighter and smaller. Reducing the weight of the surface cleaning head may increase its maneuverability. Also, reducing the height of the surface cleaning head enables the surface cleaning head to clean under furniture having a lower ground clearance.

Another type of surface cleaning apparatus is the all in the head surface cleaning apparatus. An all in the head surface cleaning apparatus has the suction motor and the air treatment members (e.g., one or more cyclones) positioned in the surface cleaning head. However, for various reasons, the all in the head vacuum cleaner has not been widely accepted by consumers.

U.S. Pat. Nos. 5,699,586; 6,012,200; 6,442,792; 7,013,528; US 2004/0134026; US 2006/0156509; and, US 2009/0056060 disclose an all in the head vacuum cleaner wherein the surface cleaning head is wedge shaped (i.e., the height of the surface cleaning head increases from the front end to the rear end). Accordingly, the height at the rear end limits the extent to which the surface cleaning head may travel under furniture. If the height is too tall, then only the front portion of the surface cleaning head may be able to be placed under furniture, thereby limiting the ability of the surface cleaning apparatus to clean under furniture.

U.S. Pat. No. 5,909,755 discloses an all in the head vacuum cleaner. However, this design has limited filtration ability. As set out in the abstract, the design uses a suction motor to draw in air having entrained particulate matter through a filter to thereby treat the air. Accordingly, while the design is not wedge shaped, it relies upon a filter to treat the air.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one aspect of this disclosure an all in the head surface cleaning apparatus may also have an above floor cleaning mode. Accordingly, the all in the head surface cleaning apparatus may be useable in the same modes as an upright vacuum cleaner and may replace an upright vacuum cleaner. In accordance with this aspect of this disclosure, an all in the head surface cleaning apparatus may include a portable cleaning unit that is removably mounted to the surface cleaning head wherein the portable cleaning unit comprises some or all of the operating components of the all in the head surface cleaning apparatus. For example, the portable cleaning unit may comprise a suction motor and one or more air treatment members. In some embodiments, the portable cleaning unit comprises all the suction motor and all of the air treatment members. Accordingly, the suction motor and air treatment member, which are contained within the removable portable cleaning unit, are used for above floor cleaning and are connected in fluid communication with the dirty air inlet on the surface cleaning head when used in a floor cleaning mode (i.e., when the portable cleaning unit is positioned in the surface cleaning head and is therefore in its floor cleaning position). Therefore, when the portable cleaning unit is used for cleaning when separated from the surface cleaning head, the air may be subjected to the same level of filtration as when the portable cleaning unit is installed in the surface cleaning head.

One advantage of providing a removable cleaning unit may be that it allows a user to lift and carry the portable cleaning unit to a cleaning location, without having to lift the entire weight of the surface cleaning head and upper portion. Accordingly, if a user wants to clean a surface above the floor, such as furniture, curtains or the ceiling, a user may merely remove the portable cleaning unit and commence cleaning. If the portable cleaning unit includes the only suction motor of the all in the head surface cleaning apparatus, then the weight of the surface cleaning head may be reduced by providing only a single suction motor.

Another advantage is that using a common suction motor and air treatment member or members in both the floor cleaning and above floor cleaning modes may help reduce the complexity and number of components required while still providing at least two cleaning modes.

The apparatus may be configured such that the portable cleaning unit may be moved from a floor cleaning position (in which it is mounted to the surface cleaning head and fluidly connected to the dirty air inlet of the surface cleaning head and useable to clean a floor) to a removal position (in which the air flow communication between the portable cleaning unit and surface cleaning head dirty air inlet is interrupted). Preferably, the portable cleaning unit may include the handle that is revealed and/or raised when the portable cleaning unit is in or is moved to the removal position.

Preferably, the portable cleaning unit remains supported by the surface cleaning head when in the removal position, such that it is stable and will resist falling over. One advantage of this configuration is that a handle, and other portions of the portable cleaning unit, may be raised to a position (e.g., a higher elevation) in which it is more comfortable for a user to grasp (e.g., the user may reach down a lesser distance to grasp and remove the portable cleaning unit).

The surface cleaning head may have a height which permits the entire surface cleaning head to extend under furniture. For example, the maximum height of the surface cleaning head may be less than 6 inches, less than 5 inches, or less than 4.0 inches. At the same time, the surface cleaning head may employ cyclonic air treatment technology and achieve a degree of air treatment comparable to that of leading upright cyclonic vacuum cleaners.

In accordance with one aspect, there is provided an all in the head surface cleaning apparatus comprising:

(a) a surface cleaning head comprising:
   (i) a rear end, a front end positioned forwardly of the rear end, an upper surface, and first and second laterally opposed sidewalls;
   (ii) a dirty air inlet;
(b) a portable cleaning unit removably mounted to the surface cleaning head, the portable cleaning unit comprising:
   (i) an air treatment member assembly comprising an air treatment member;
   (ii) a suction motor having a suction motor axis, the cleaning unit being at least partially seated within the surface cleaning head when mounted to the surface cleaning head in a floor cleaning position, the portable cleaning unit is usable for cleaning when removed from the surface cleaning head; and,
   (iii) a clean air outlet downstream from the suction motor;
(c) a first air flow path extending between the dirty air inlet and the clean air outlet when the portable cleaning unit is in the floor cleaning position, the first air flow path including the air treatment member and the suction motor; and,
(d) an upper portion moveably mounted to the surface cleaning head between a storage position and a floor cleaning position, the upper portion comprising a drive handle.

In any embodiment, the surface cleaning head may have a recess and the portable cleaning unit may be positioned in the recess when the portable cleaning unit is mounted to the surface cleaning head. The recess may be provided in the upper surface of the surface cleaning head. Optionally, at least 75% of the portable cleaning unit is positioned in the recess when the portable cleaning unit is mounted to the surface cleaning head.

In any embodiment, an upper surface of the portable cleaning unit may be substantially flush with the upper surface of the surface cleaning head when the portable cleaning unit is mounted to the surface cleaning head.

In any embodiment, the portable cleaning unit may be rotatably moveable from the floor cleaning position to a removal position in which portable cleaning unit is mounted on the surface cleaning head and air flow communication between the portable cleaning unit and the dirt air inlet is interrupted.

In any embodiment, the portable cleaning unit may comprise a carry handle that may be recessed into the surface cleaning head when the portable cleaning unit is mounted to the surface cleaning head.

In any embodiment, the surface cleaning head may further comprise a moveably mounted platform and the portable cleaning unit may be removably mounted to the platform.

In any embodiment, the air treatment member assembly may comprise a cyclone assembly and the air treatment member may comprise a cyclone chamber having a longitudinal cyclone axis that extends between the first and second laterally opposed sides.

In any embodiment, the surface cleaning head may further comprise a rotating cleaning brush and a brush motor, the brush motor having a brush motor axis wherein the brush motor is positioned forward of the suction motor. Optionally, the brush motor axis and the suction motor axis may extend generally transverse to the forward direction and the brush motor may be laterally spaced from the air treatment member.

In any embodiment, the apparatus may further comprise a biasing member biasing the portable cleaning unit away from the floor cleaning position.

In accordance with another aspect, there is provided an all in the head surface cleaning apparatus comprising a surface cleaning head, the apparatus comprising:

(a) a surface cleaning head comprising a rear end, a front end positioned forwardly of the rear end, first and second laterally opposed sidewalls and a dirty air inlet;
(b) a portable cleaning unit removably mounted to the surface cleaning head, the portable cleaning unit comprising an air treatment member assembly and a suction motor, the cleaning unit being moveable from a floor cleaning position, in which the portable cleaning unit is in air flow communication with the dirty air inlet, to a portable cleaning unit removal position, in which the air flow communication between the portable cleaning unit and dirty air inlet is interrupted; and,
(c) a biasing member biasing the portable cleaning unit away from the floor cleaning position; and,
(d) an upper portion moveably mounted to the surface cleaning head between a storage position and a floor cleaning position, the upper portion comprising a drive handle.

In any embodiment, the surface cleaning head may have a recess and the portable cleaning unit may be positioned in the recess when the portable cleaning unit is mounted to the surface cleaning head and is in the floor cleaning position. Optionally, the recess may be provided in the upper surface of the surface cleaning head. At least 75% of the portable cleaning unit may be positioned in the recess when the portable cleaning unit is mounted to the surface cleaning head.

In any embodiment, an upper surface of the portable cleaning unit may be substantially flush with the upper surface of the surface cleaning head when the portable cleaning unit is mounted to the surface cleaning head.

In any embodiment, the portable cleaning unit may be rotatably moveable from the floor cleaning position to the removal position.

In any embodiment, the portable cleaning unit may comprise a carry handle that is recessed into the surface cleaning head when the portable cleaning unit is mounted to the surface cleaning head.

In any embodiment, the surface cleaning head may further comprise a moveably mounted platform and the portable cleaning unit may be removably mounted to the platform.

In any embodiment, the air treatment member assembly may comprise a cyclone assembly comprising a cyclone chamber having a longitudinal cyclone axis that extends between the first and second laterally opposed sides.

In any embodiment, the apparatus may further comprise a brush and a brush motor, the brush motor having a brush motor axis wherein the brush motor is positioned forward of the suction motor. Optionally, the brush motor axis and a suction motor axis may extend generally transverse to a forward direction and wherein the brush motor is laterally spaced from the air treatment member.

In any embodiment, the surface cleaning head may further comprise a brush chamber positioned toward the front end for containing a cleaning brush and the portable cleaning unit may comprise an air inlet extending along an inlet axis, wherein when the portable cleaning unit is in the floor cleaning position the inlet axis intersects the brush chamber and when the portable cleaning unit is in the removal position the inlet axis does not intersect the brush chamber.

In any embodiment, the suction motor may comprise a suction motor axis that extends generally parallel to a horizontal direction when the portable cleaning unit is in the floor cleaning position, and the suction motor axis may be inclined relative to the horizontal direction when the portable cleaning unit is in the removal position.

BRIEF DESCRIPTION OF THE DRAWINGS

The drawings included herewith are for illustrating various examples of articles, methods, and apparatuses of the teaching of the present specification and are not intended to limit the scope of what is taught in any way. In the drawings.

DETAILED DESCRIPTION

Figure 1:
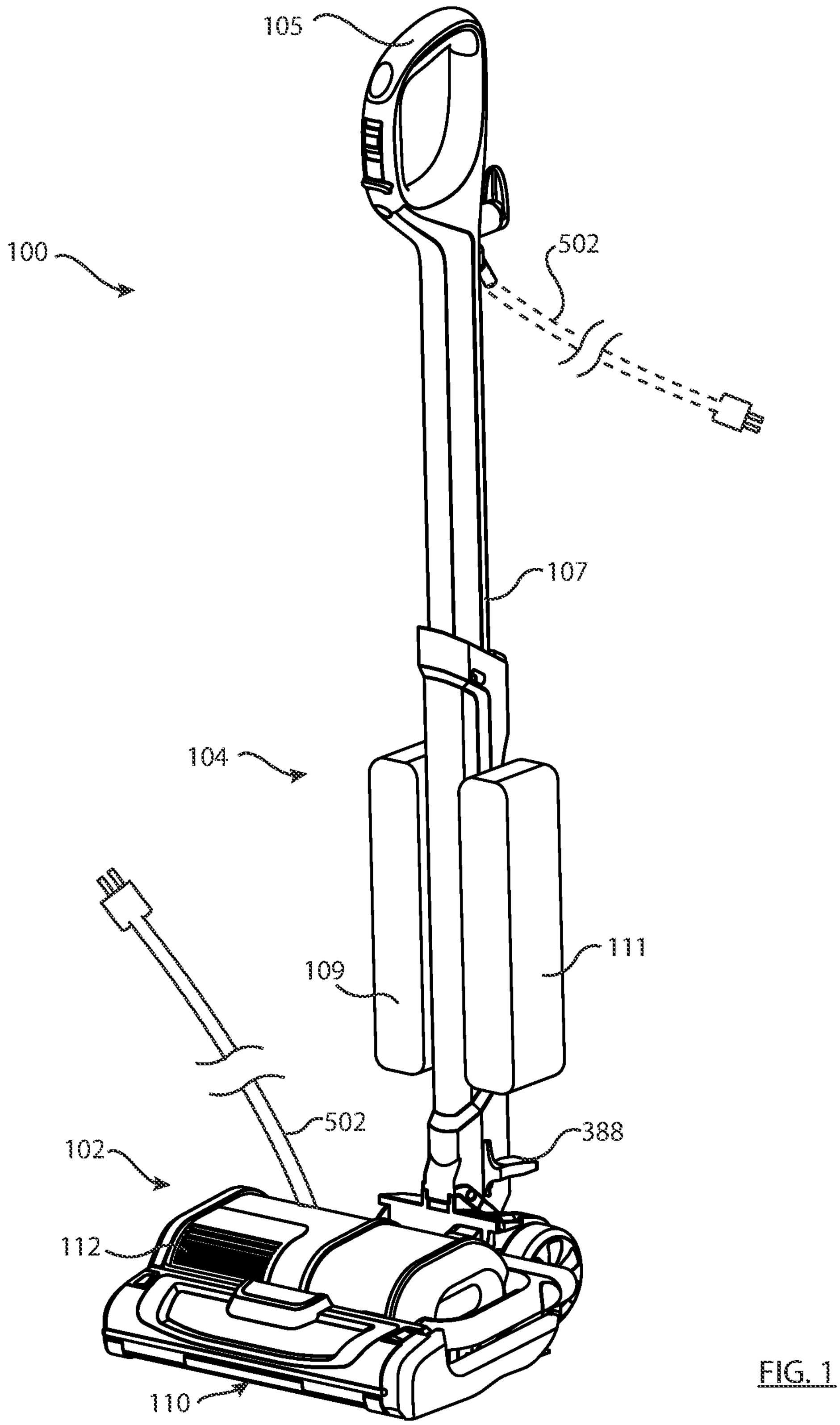
FIG. 1 is a front perspective view of an example of an all in the head type surface cleaning apparatus.
Figure 2:
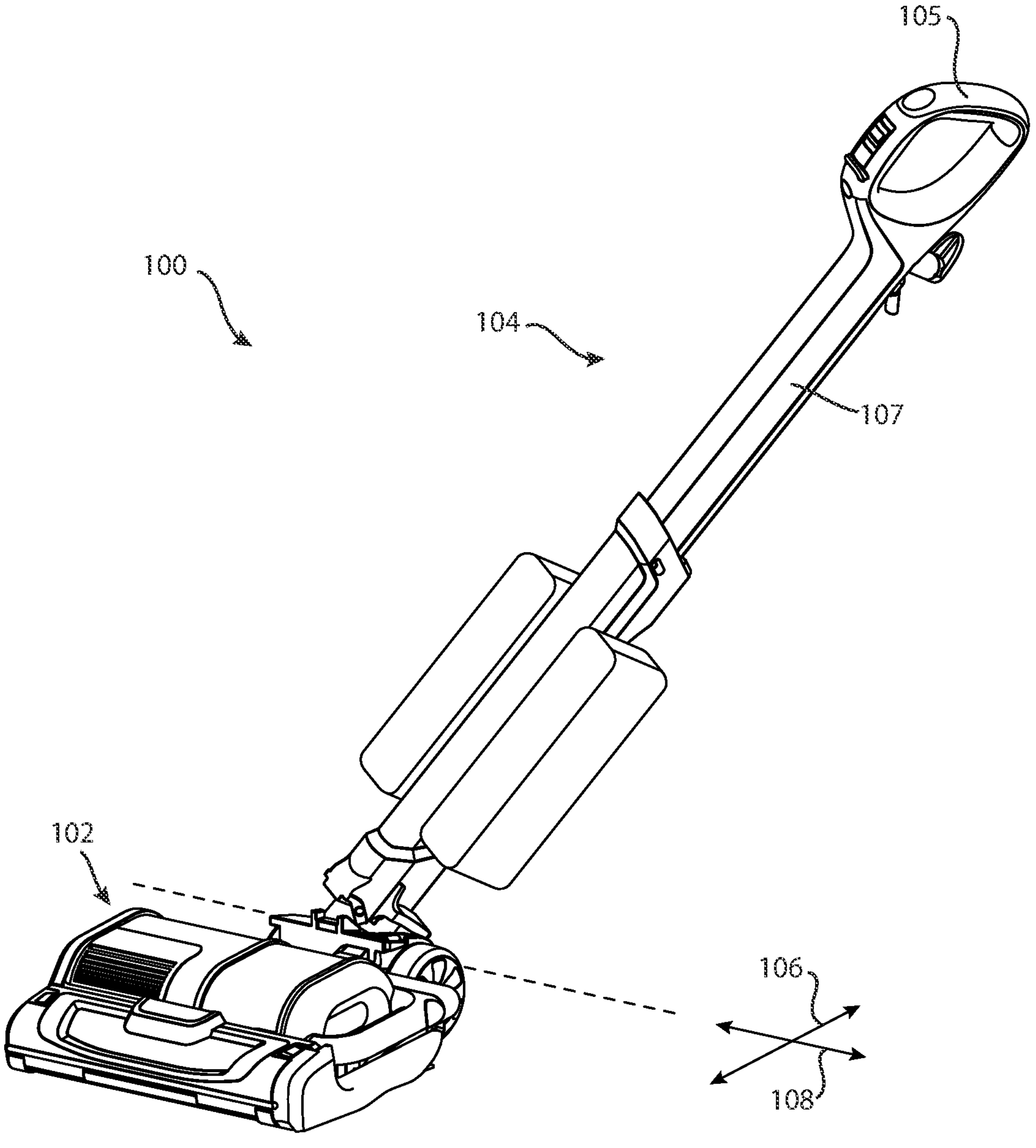
FIG. 2 is a front perspective view of the surface cleaning apparatus of FIG. 1 with an upper portion in a use position such that the surface cleaning apparatus is in a floor cleaning mode.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

As exemplified herein, the surface cleaning apparatus is an all in the head vacuum cleaner. It will be appreciated that, in some embodiments, aspects disclosed herein may be used in other surface cleaning apparatus such as extractors or in surface cleaning heads of other vacuum cleaners, such as an upright vacuum cleaner or a canister vacuum cleaner.

General Description of an All in the Head Vacuum Cleaner

Referring to FIGS. 1-6, an embodiment of a surface cleaning apparatus 100 is shown. The surface cleaning apparatus 100 includes a surface cleaning head 102 and an upper portion 104 that is movably and drivingly connected to the surface cleaning head 102. The surface cleaning head 102 may be supported by any suitable support members, such as, for example wheels and/or rollers, to allow the surface cleaning head to be moved across the floor or other surface being cleaned. The support members (e.g., wheels) may be of any suitable configuration, and may be attached to any suitable part of the surface cleaning apparatus, including, for example, the surface cleaning head and upper portion.

The surface cleaning apparatus 100 preferably includes a dirty air inlet 110, a clean air outlet 112 and an air flow path or passage extending therebetween. Preferably, at least one suction motor and at least one air treatment member assembly are provided in the air flow path. The air treatment member assembly may include an air treatment member, including, for example, one or more cyclones (arranged in series or in parallel with each other), filters, bags and other dirt separation devices, and a dirt collection area. Preferably, the at least one air treatment member assembly is provided upstream from the suction motor, but alternatively may be provided downstream from the suction motor or both upstream and downstream from the suction motor. In addition to the at least one air treatment member assembly, the surface cleaning apparatus may also include one or more pre-motor filters (preferably positioned in the air flow path between the air treatment member assembly and the suction motor) and/or one or more post-motor filters (positioned in the air flow path between the suction motor and the clean air outlet).

In the illustrated embodiment, the surface cleaning apparatus includes an air treatment member assembly in the form of a cyclone bin assembly 160 (FIGS. 5, 7 and 9) positioned in the air flow path downstream from the dirty air inlet 110, and a suction motor 162 positioned downstream from the cyclone bin assembly 160. Preferably, the cyclone bin assembly 160 is detachable from surface cleaning head 102 with or without the suction motor 162 (FIG. 9) for emptying. The suction motor 162 has an air inlet 246 and can rotate about a suction motor axis 182.

Upper portion 104 may be of any design known in the art that is drivingly connected to surface cleaning head 102 so as to permit a user to move surface cleaning head 102 across a surface to be cleaned (such as a floor). Upper portion 104 may be moveably (e.g., pivotally) connected to surface cleaning head for movement between an upright storage position as exemplified in FIG. 1 and an inclined in use position as exemplified in FIG. 2. If upper portion 104 is moveably connected to surface cleaning head 102 about only one axis or rotation (e.g., a horizontal axis), then upper portion 104 may be used to move surface cleaning head 102 in a generally forward/backward direction of travel, indicated by arrow 106. A direction generally orthogonal to the direction of travel, indicated by arrow 108 defines a lateral or transverse direction. In some embodiments, upper portion 104 may be rotatably connected to surface cleaning head 102, such as by a swivel connection, so as to enable a user to steer the surface cleaning head 102 using the upper portion 104.

Upper portion 104 may comprise a hand grip portion 105 and a drive handle or drive shaft 107. Drive shaft 107 may be useable as an above floor cleaning wand and/or it may provide electrical cord storage and/or auxiliary cleaning tool storage and/or it may be used to hang the surface cleaning apparatus on a wall when not in use In the embodiment illustrated, the surface cleaning apparatus 100 is an all in the head type vacuum cleaner in which the functional or operational components for the transport and treatment of fluid (e.g., air) entering the dirty air inlet of the vacuum cleaner (e.g. the suction motor, air treatment member, filters, motors, etc.) are all contained within the surface cleaning head 102 portion of surface cleaning apparatus 100. Providing the functional air flow components within the surface cleaning head may help reduce the size and/or weight of the upper portion and/or help lower the centre of gravity of the surface cleaning apparatus. Accordingly, the hand weight experienced by a user operating surface cleaning apparatus 100 may be reduced.

In some embodiments, the surface cleaning head may also be configured to accommodate functional components that do not form part of the air flow path, such as, for example, brush motors, brushes, on board energy storage systems, controllers and other components.

Alternatively, while being free from air flow components, the upper section may include some non-airflow related components, such as, for example, electrical cord connections, electrical cord storage members, handles, actuators, steering components, and other functional, on board energy storage systems. In the illustrated example, the upper portion 104 includes an optional storage compartment 109 (for example for storing auxiliary cleaning tools) and an optional battery pack 111 that may be mounted to, and movable with, the drive shaft 107. The battery pack 111 may be electrically connected to the suction motor, brush motor, lights and/or any other electrical components on the apparatus. If the surface cleaning apparatus is battery powered, the batteries may be located elsewhere.

Figure 3:
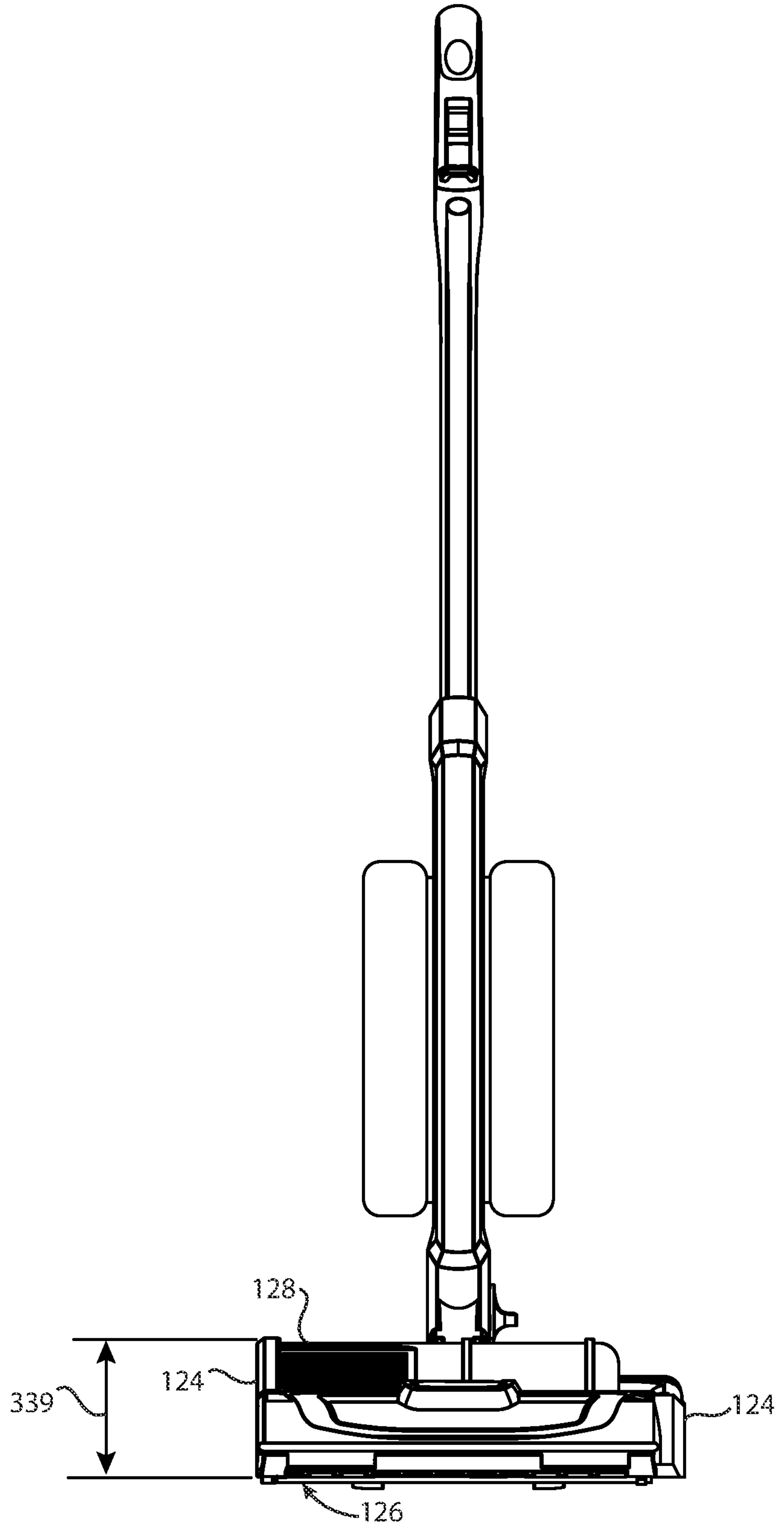
FIG. 3 is a front elevation view of the surface cleaning apparatus of FIG. 1.
Figure 4:
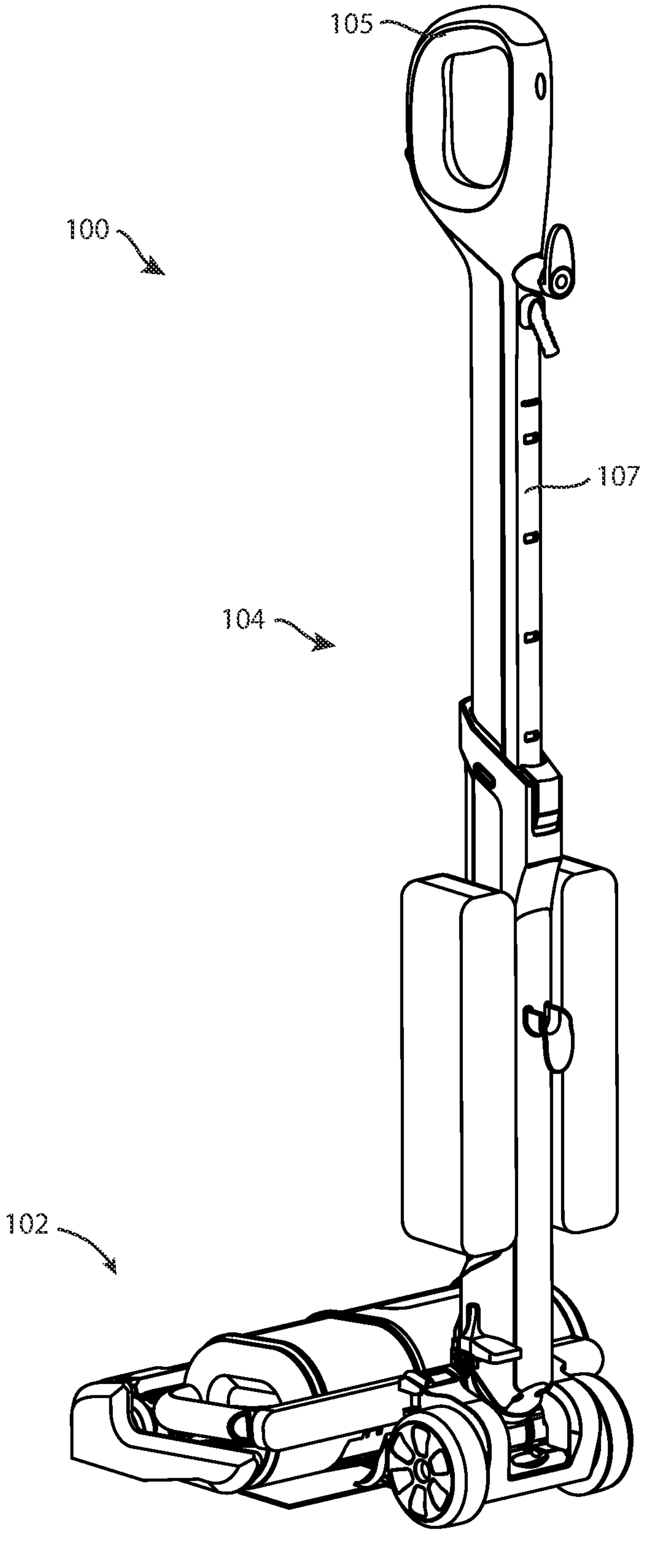
FIG. 4 is a rear perspective view of the surface cleaning apparatus of FIG. 1.
Figure 5:
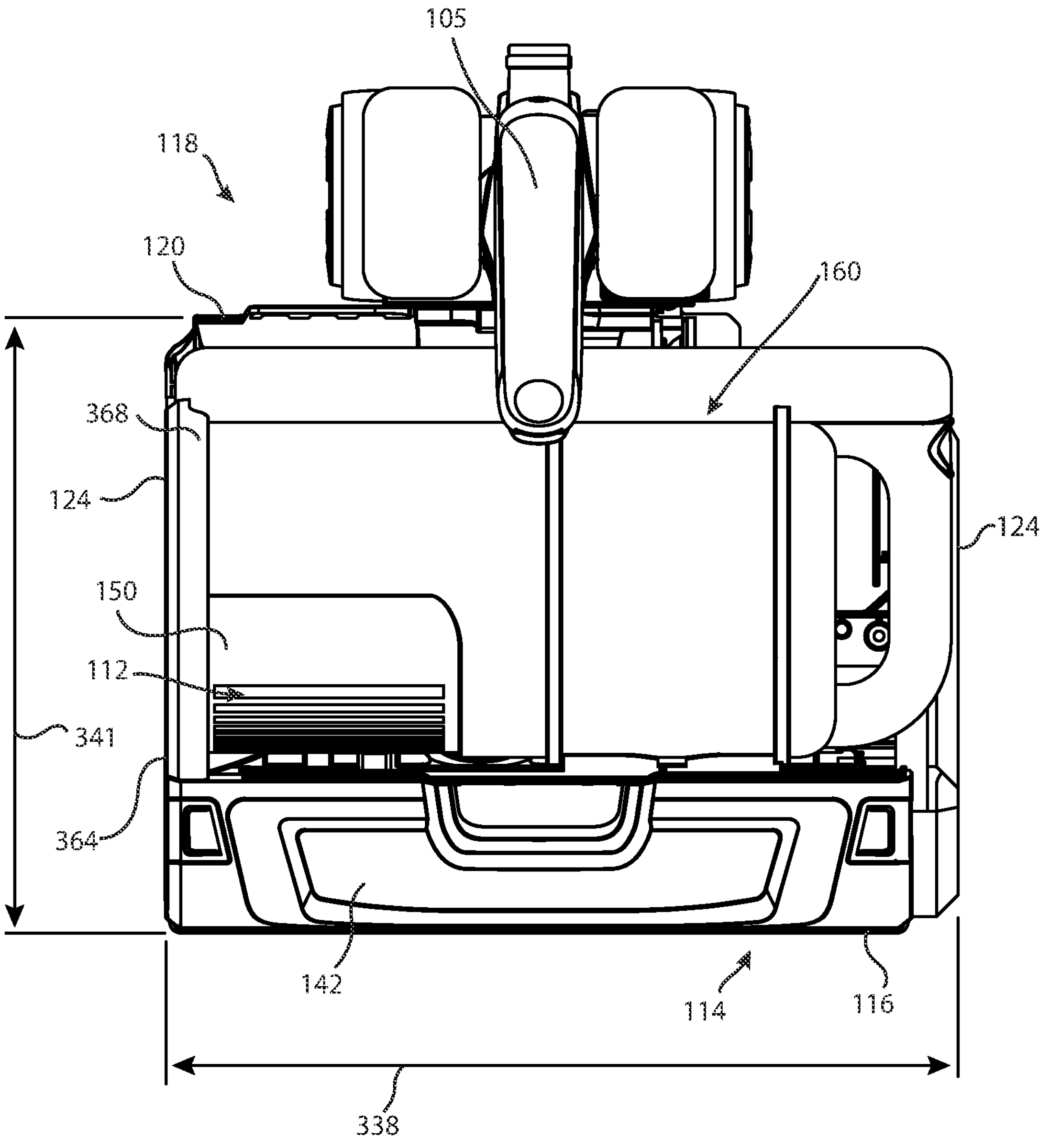
FIG. 5 is a top plan view of the surface cleaning apparatus of FIG. 1.
Figure 6:
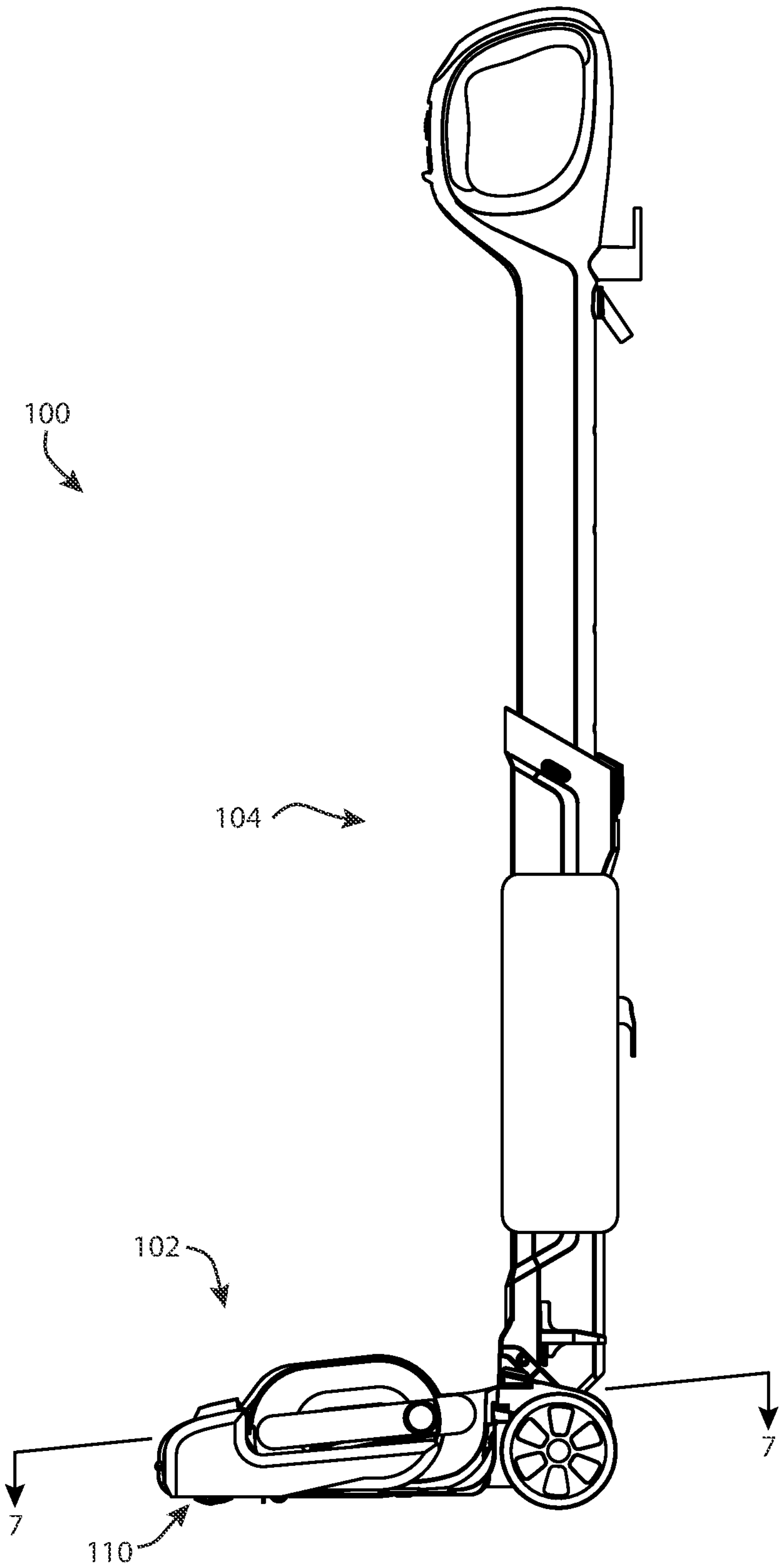
FIG. 6 is a side elevation view of the surface cleaning apparatus of FIG. 1.

Referring to FIGS. 3-5, in the illustrated example, the surface cleaning head 102 includes a front end 114 having a front face 116, a rear end 118 spaced rearwardly from the front end and having a rear face 120, and a pair of side faces 124 that are laterally spaced apart from each other and extend from the front face 116 to the rear face 120. The surface cleaning head 102 also has a bottom face 126 that extends between the front end 114, rear end 118, and side faces 124. The bottom face 126 is positioned to face the surface being cleaned when the surface cleaning apparatus 100 is in use.

Referring to FIG. 3, a top face 128 is generally spaced apart from and overlies bottom face 126. Together, front face 116, rear face 120, side faces 124, bottom face 126, and top face 128 co-operate to bound an interior of the surface cleaning head 102, which, in the illustrated example, is configured to house the functional components of the air flow path of the surface cleaning apparatus 100. Preferably, in an all in the head type vacuum cleaner, the surface cleaning head 102 includes the dirty air inlet 110 and the clean air outlet 112. The surface cleaning apparatus 100 has an overall depth 341 (FIG. 5), measured in the forward/backward direction, which may be any suitable depth sufficient to accommodate the components of the surface cleaning apparatus 100, and may be less than about 20 inches, less than about 15 inches, less than about 10 inches, less than about 9 inches, less than about 8.5 inches, and optionally less than about 8 inches.

In the exemplified embodiment, surface cleaning head 102 has a generally rectangular footprint when viewed from above. It will be appreciated that front, rear, and sides faces need not extend linearly and that surface cleaning head may be of various shapes.

Figure 7:
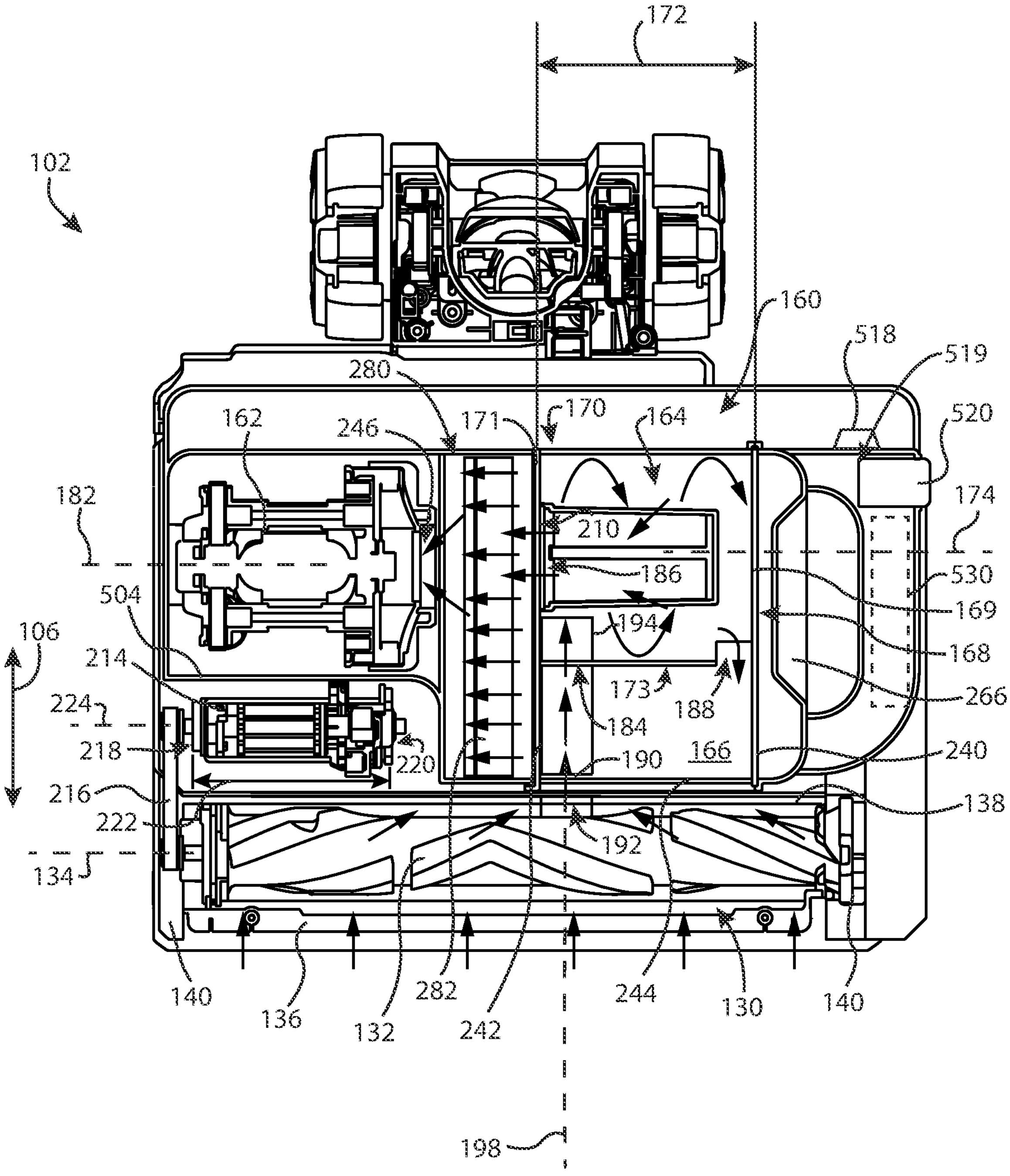
FIG. 7 is a cross-sectional view of a portion of the surface cleaning apparatus, taken along line 7-7 in FIG. 6.

As exemplified in FIG. 7, surface cleaning head 102 may include a brush chamber 130 that is configured to house a rotatable agitator brush 132. Rotatable brush 132 may be rotatable about a brush axis 134 that may be generally orthogonal to the direction of travel 106 of surface cleaning head 102. Alternatively, any other agitation or cleaning member known in the art may be used in place of, or in addition to, rotatable brush 132. Further, rotatable brush 132 may be any rotatable brush known in the art and may be driven by any drive means known in the art, such as a fan belt, direct drive, providing the brush motor internal of rotatable brush 132, an air driven turbine, or the like. In the illustrated embodiment, the surface cleaning head 102 also includes a brush motor 214 that is drivingly connected to the rotatable brush 132 by a drive linkage 216, which in the illustrated example includes a drive belt. The brush motor 214 has a first end 218 and a second end 220 that are spaced apart from each other by a brush motor length 222, along a brush motor axis 224, about which the rotor of the brush motor 214 rotates.

As exemplified in the cross-sectional view of FIG. 7, brush chamber 130 may include a front wall 136, a rear wall 138, two sidewalls 140 and a top wall 142 (FIG. 5). Brush chamber 130 may be located at the front 114 of surface cleaning head 102, and, as in the illustrated embodiment, an outer surface of front wall 136 of brush chamber 130 may form at least a portion of front face 116 of surface cleaning head 102.

As exemplified, the bottom side of brush chamber 130 is at least partially open and forms the dirty air inlet 110 of surface cleaning apparatus 100. In the illustrated example the open bottom side of the brush chamber 130 is generally rectangular in shape, but alternatively could be configured in other shapes. As exemplified, the brush chamber 130 may extend from the bottom face 126 to the top face 128 of the surface cleaning head 102, so that an outer surface of the top wall 142 of the brush chamber 130 forms part of the top face 128 of the surface cleaning head 102, and the open, bottom side of the brush chamber 130 forms part of the bottom face 126 of the surface cleaning head 102.

As exemplified in FIG. 5, the clean air outlet 112 may be provided on the upward facing, top face 128 of the surface cleaning head 102 and may be covered by a grill 150. Preferably, the grill 150 is removable to allow access to the clean air outlet 112. An advantage of this design is that treated air is directed away from the surface to be cleaned and away from a user (who is standing behind upper portion 104). Alternately clean air outlet 112 may direct treated air rearwardly.

Optionally a post-motor filter may be provided upstream of the suction motor, such as at the clear air outlet 112, to filter air that has passed through the air treatment member and suction motor. The filter may be provided as a generally planar post-motor filter made from foam and/or felt that is positioned beneath the grill 150. Removing the grill 150 provides access to the post-motor filter for inspection and/or replacement. Optionally, instead of, or in addition to the felt filter, the post-motor filter may include one or more other filters or filtering media, including, for example, a HEPA filter, an electrostatic filter, a cyclonic post-motor filter or other suitable filter.

It will be appreciated that the forgoing is a general description of an all in the head vacuum cleaner. It will be appreciated that the actual size and shape of the surface cleaning head may depend upon which of the following aspects are included in the product design.

Cyclone Bin Assembly

The following is a description of a cyclone bin assembly having various features, any or all of which may be used (individually or in any combination or sub-combination) in any surface cleaning apparatus or in any combination or sub-combination with any other feature or features disclosed herein.

Figure 8:
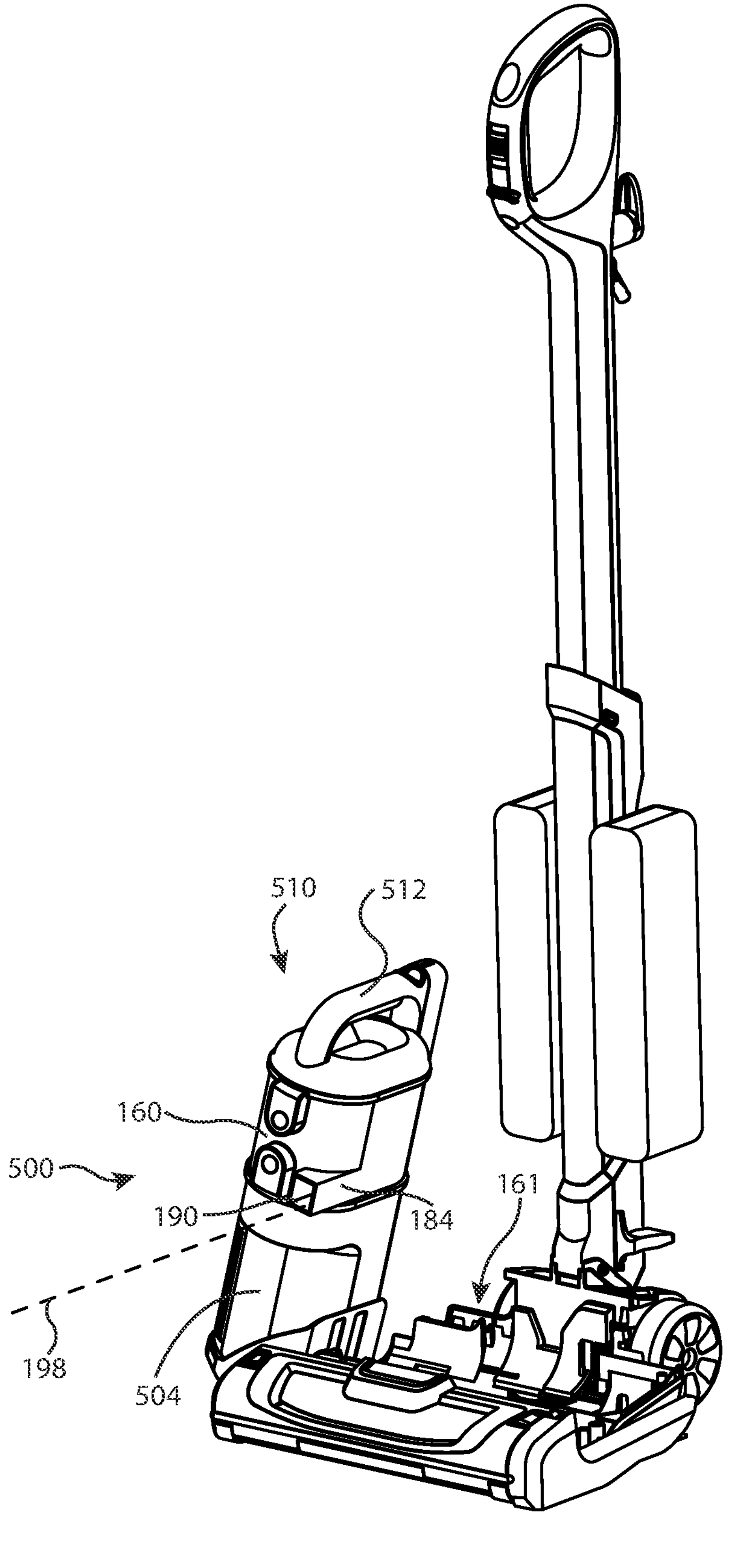
FIG. 8 is a front perspective view of the surface cleaning apparatus of FIG. 1 with a portable cleaning unit in a removal position.
Figure 9:
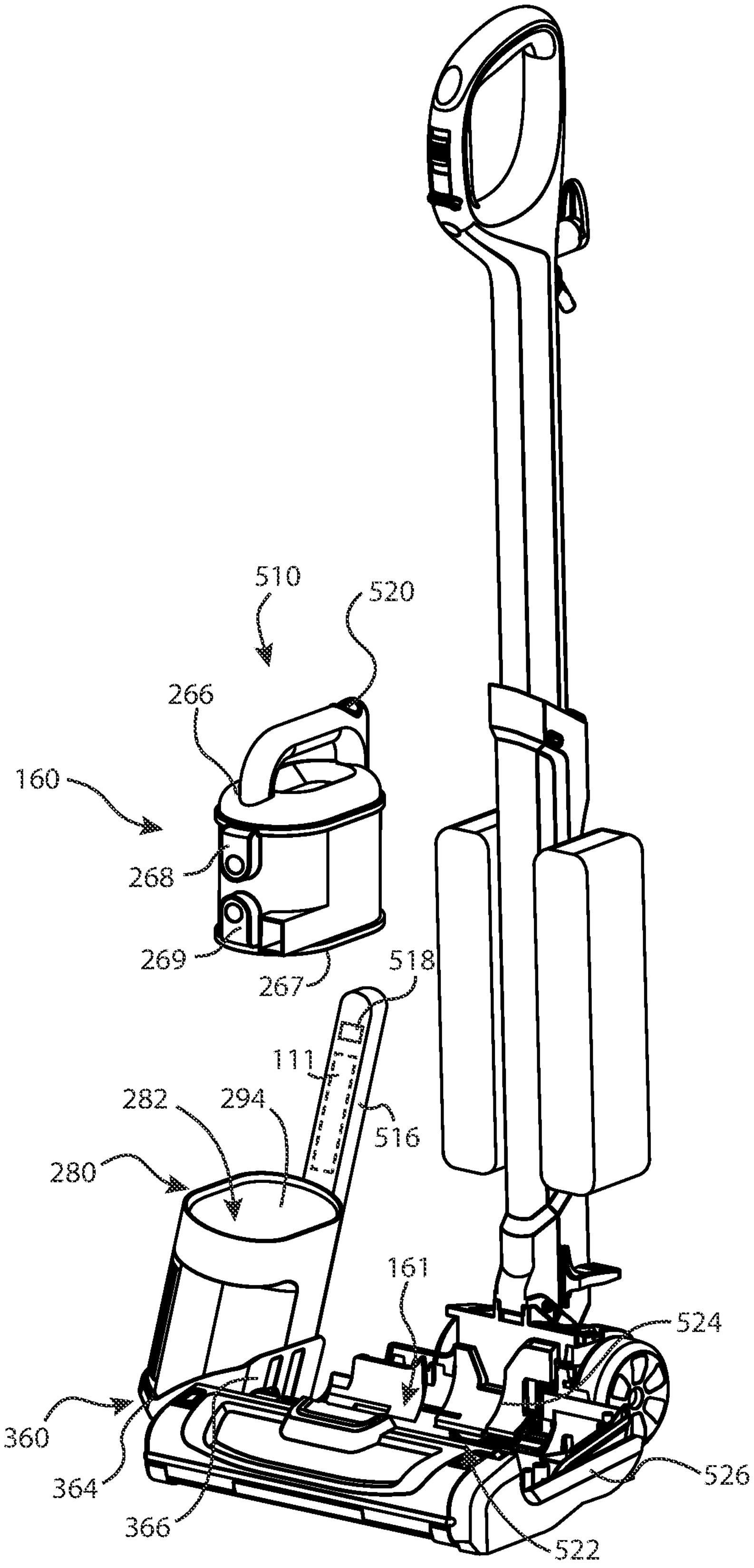
FIG. 9 is the front perspective view of FIG. 8 with an air treatment member assembly removed.

Referring to FIGS. 7-9, in the illustrated example, cyclone bin assembly 160 includes a cyclone chamber 164 and a dirt collection chamber 166. In the illustrated example, dirt collection chamber 166 is external the cyclone chamber 164. In accordance with one feature of the cyclone bin assembly, dirt collection chamber 166 may be positioned forward and/or rearward of cyclone chamber 164 and not on top of or below cyclone chamber 164. An advantage of this design is that by not positioning the dirt collection chamber above or below the cyclone chamber (or by reducing the height of the portion of the dirt collection chamber above or below the cyclone chamber) the height 339 (FIG. 3) of the surface cleaning head 102 may be reduced without reducing the diameter of cyclone chamber 164 and/or the diameter of the cyclone chamber may be increased (thereby increasing the air flow rate through the vacuum cleaner) without increasing the height of the surface cleaning head.

As exemplified, cyclone chamber 164 has a first cyclone end 168 with a first end wall 169, and a second cyclone end 170 with a second end wall 171. A generally cylindrical cyclone sidewall 173 extends between first end wall 169 and second end wall 171, spaced apart from each other by cyclone length 172 along a cyclone axis 174, about which air circulates. The cyclone chamber 164 also includes a cyclone air inlet 184, a cyclone air outlet 186, and a dirt outlet 188.

As exemplified in FIGS. 7 and 8, the cyclone air inlet 184 may include an upstream or inlet end 190 that is connectable to a brush chamber air outlet 192 that may be provided in the rear wall 138 of the brush chamber 130. Cyclone air inlet 184 may also include a downstream end 194 that includes an opening formed in the cyclone sidewall 173, and a connecting portion extending through dirt collection chamber 166 between upstream end 190 and downstream end 194. The air flow connection between brush chamber outlet 192 and cyclone chamber 164 may form a first air flow path portion, which is a portion of the overall air flow path connecting dirty air inlet 110 to clean air outlet 112. As exemplified the first flow path may be generally free from bends/corners and is essentially linear along its entire length (with the exception of minor variations in the wall diameter), from opening 192 in brush chamber rear wall 138 to a tangentially oriented opening in cyclone sidewall 173 proximate downstream end 194. Providing a linear first air flow path may help reduce air flow losses as air flows through the first flow path. In addition, the first flow path is relatively short and provides a generally direct air flow path from brush chamber 130 to cyclone chamber 164. Providing a relatively short, direct air flow path may help reduce the likelihood of the air flow path becoming clogged by debris or otherwise blocked.

Cyclone air inlet 184 may be provided at any desired location on cyclone chamber 164, and in the illustrated example is provided toward a bottom side of cyclone chamber 164, below a horizontal plane containing cyclone axis 174. In this configuration, a cyclone air inlet axis 198 (FIG. 8) intersects cyclone chamber 164, brush chamber 130, and rotating brush 132 when the cyclone bin assembly 160 is in the floor cleaning position (FIG. 1).

In the illustrated example, inlet end 190 of cyclone air inlet 184 is integrally formed with cyclone bin assembly 160. In this configuration, inlet end 190 can be disconnected from air outlet 192 of brush chamber 130 and removed from the surface cleaning head with cyclone bin assembly 160.

As exemplified in FIG. 7, in the illustrated example, cyclone air outlet 186 includes an aperture 210 that is generally centrally located on second end wall 171 of cyclone chamber 164. Any cyclone air outlet may be used.

The dirt collection chamber may be of any suitable configuration. Preferably, as exemplified in FIG. 7, dirt collection chamber 166 is exterior to cyclone chamber 164, and preferably includes a first end wall 240, a second end wall 242, and a sidewall 244 extending therebetween. As exemplified, sidewall 244 partially laterally surrounds cyclone chamber 164. At least partially positioning dirt collection chamber 166 forward or rearward of cyclone chamber 164 may help reduce the overall height of the surface cleaning head 102. As exemplified, cyclone sidewall 173 may be coincident with sidewall 244 at one or more locations around its perimeter. Optionally, portions of dirt chamber sidewall 244 can form portions of the outer or exposed surface of surface cleaning apparatus 100 when cyclone bin assembly 160 is mounted in cavity 161.

As exemplified, a majority of dirt collection chamber 166 is located forward of cyclone chamber 164 (in the direction of travel 106 of the surface cleaning head 102), between cyclone chamber 164 and brush chamber 130. In some configurations, the rear portions of cyclone sidewall 173 and dirt collection chamber sidewall 244 may be coincident, and the front portion of the cyclone sidewall 173 may be spaced apart from the front portion of the dirt collection chamber sidewall 244. Locating the cyclone chamber 164 toward the rear of cyclone bin assembly 160 may help align cyclone air outlet 186 with air inlet 246 (FIG. 7) of suction motor 162. Locating the dirt collection chamber 166 forward of cyclone chamber 164 may help make dirt collection chamber 166 more easily viewable by a user (particularly if some or all of dirt collection chamber sidewall 244 is transparent and there is no lid overlying the cyclone bin assembly 160 or such a lid is transparent), which may allow a user to inspect the condition of dirt collection chamber 166 without having to remove cyclone bin assembly 160 from cavity 161.

In the illustrated example, dirt collection chamber 166 is located solely in front of cyclone chamber 164 and does not extend above or below the cyclone chamber 164. It will be appreciated that small portions of the dirt collection chamber may be positioned above or below the cyclone chamber without significantly deviating from the advantage of this feature. In this configuration, the overall height of cyclone bin assembly 160 (measured in a vertical direction when the cyclone bin assembly is mounted to the surface cleaning head) is generally equal to the outer diameter of cyclone chamber 164 (i.e. including the wall thicknesses), while the overall width of cyclone bin assembly 160 (measured in the front/back direction 106 when the cyclone bin assembly is mounted to the surface cleaning head) is greater than the cyclone diameter. Providing the dirt collection chamber 166 only in front of cyclone chamber 164 may help reduce the overall height of cyclone bin assembly 160 while still providing a dirt collection chamber 166 with a practical internal storage volume. Reducing the overall height of cyclone bin assembly 160 may help reduce the overall height 339 (FIG. 3) of surface cleaning head 102 when cyclone bin assembly 160 is mounted in cavity 161. Preferably, the overall height 339 of surface cleaning head 102 is less than about 10 inches, less than about 8 inches, less than about 6 inches, less than about 5 inches, less than about 4.5 inches and optionally less than 4 inches.

Alternatively, the cyclone bin assembly 160 may be configured so that the dirt collection chamber is located entirely behind the cyclone chamber (i.e. between the cyclone chamber and the rear face of the surface cleaning head), or is located partially in front of and partially behind the cyclone chamber and so that the dirt collection chamber extends partially or entirely above and/or below the cyclone chamber.

Cyclone chamber 164 may be in communication with a dirt collection chamber 166 by any suitable cyclone dirt outlet known in the art. Preferably the cyclone chamber includes at least one dirt outlet in communication with the dirt chamber that is external the cyclone chamber.

Optionally, to help facilitate emptying the dirt collection chamber, at least one of or both of the end walls may be openable. Similarly, one or both of the cyclone chamber end walls and may be openable to allow a user to empty debris from the cyclone chamber.

Referring to FIG. 7, in the illustrated example, the end wall 240 of the dirt collection chamber is openable to empty dirt collection chamber 166. The first cyclone end wall 169 is mounted to, and openable with, dirt chamber end wall 240 and together both form part of openable door 266 of cyclone bin assembly 160. Door 266 is moveable between a closed position and an open position. When door 266 is open, both cyclone chamber 164 and dirt collection chamber 166 can be emptied concurrently. Alternatively, the end walls of the dirt collection chamber and the cyclone chamber need not be connected with each other, and the dirt collection chamber may be openable independently of the cyclone chamber.

Preferably, openable door 266 can be secured in its closed position until opened by a user. Door 266 may be held closed using any suitable latch or fastening mechanism, such as latch 268 (FIG. 9). Optionally, the latch can be provided in a location that is inaccessible when the cyclone bin assembly is mounted to the surface cleaning head. This may help prevent the door from being opened inadvertently. In the illustrated example, when cyclone bin assembly 160 is mounted in cavity 161, latch 268 is disposed between dirt chamber sidewall 244 and brush chamber 130 and is inaccessible to the user.

Optionally, the opposing ends of the cyclone chamber 164 and dirt collection chamber 166 may also be openable. For example, the end walls 171 and 242 may both be provided as portions of a second openable door 267 (FIG. 9) that is held in its closed position using a latch 269. In this arrangement, both the ends of the cyclone and dirt collection chambers can be simultaneously opened. This may help facilitate emptying and/or cleaning of the cyclone bin assembly 160.

In the illustrated example, portions of cyclone sidewall 173 coincide with portions of dirt chamber sidewall 244 and form portions of the outer, exposed surface of cyclone bin assembly 160. Further, when cyclone bin assembly 160 is attached to surface cleaning head 102, portions of the outer surface of cyclone bin assembly 160 provide portions of, and are substantially flush with the top face 128 of surface cleaning head 102.

The cyclone bin assembly 160 may be detachable from the rest of the apparatus as a generally sealed unit, but for the inlet end 190 and the outlet aperture 210. Providing a detachable cyclone bin assembly 160 allows a user to carry cyclone bin assembly 160 to a garbage can for emptying, without needing to carry or move the rest of surface cleaning apparatus 100. The cyclone bin assembly may be removable from when the portable cleaning unit 500 has been removed from the surface cleaning head and/or when the suction motor is still connected to the surface cleaning head.

It will be appreciated that some of the embodiments disclosed herein may not use any of the features of the cyclone bin assembly disclosed herein and that, in those embodiments, any air treatment member assembly known in the art may be used.

Removable Portable Cleaning Unit

The following is a description of a portable cleaning unit having various features, any or all of which may be used (individually or in any combination or sub-combination) in any surface cleaning apparatus or in any combination or sub-combination with any other feature or features disclosed herein.

Optionally, a portion of the apparatus 100 can be detachable from the rest of the apparatus 100, and can be operable as a portable cleaning unit. For example, portions of the apparatus 100 may be separable from the surface cleaning head 102 and upper portion 104 and usable as a separate cleaning unit. This may allow a user to clean without having to move around the weight of the cleaning head 102 and upper portion 104. This may also allow a user to operate the apparatus 100 in an above floor cleaning configuration, where the removable cleaning unit may be used to clean above-floor areas, such as furniture and window coverings.

Optionally, the removable portions of the apparatus 100 may include the same suction motor and cyclone bin assembly that are utilized in the floor cleaning configuration. This may allow a common suction motor and cyclone bin assembly to be used in at least two cleaning configurations, and may help reduce the need to provide additional suction motors and air treatment members.

Figure 10:
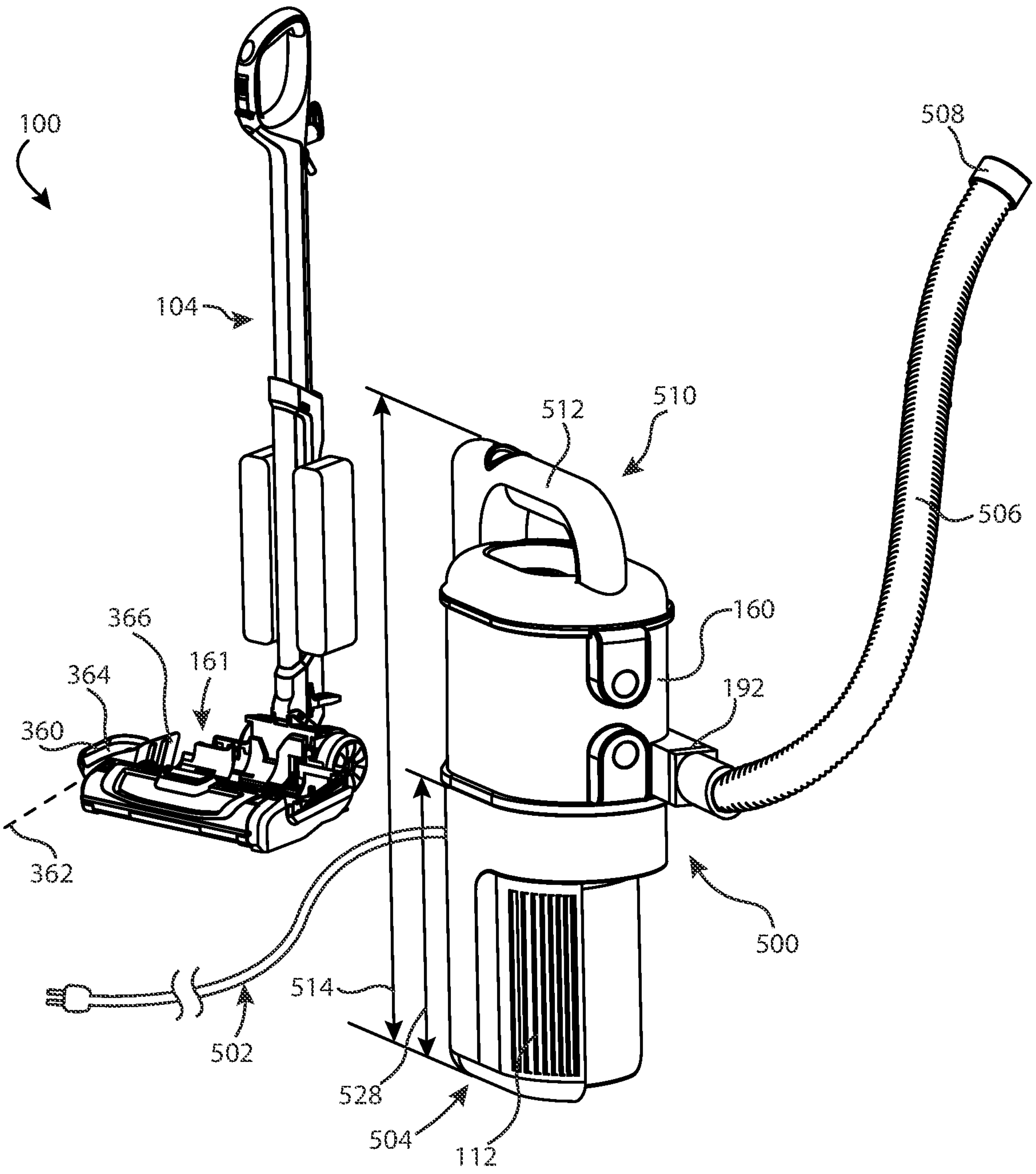
FIG. 10 is a front perspective view of the surface cleaning apparatus of FIG. 1 with the portable cleaning unit removed from the surface cleaning head and an optional hose installed; and, FIG. 11 is a partially-exploded perspective view of a portion of the surface cleaning apparatus of FIG. 1.

Referring to FIG. 10, in the illustrated embodiment, the apparatus 100 includes a removable, portable cleaning unit 500 that includes the cyclone bin assembly 160 and a housing portion 504 that houses the suction motor 162, and in this example includes the clean air outlet 112. When the portable cleaning unit 500 is mounted to the surface cleaning head 102 (FIG. 1), the apparatus 100 is in its floor cleaning configuration. When the portable cleaning unit 500 is removed (FIG. 10) the apparatus is in an above floor cleaning configuration.

Optionally, one or more auxiliary cleaning tools, wands, hoses and the like may be selectively connected to the portable cleaning unit 500, preferably when in the above floor cleaning configuration. FIG. 10 illustrates one example of a flexible hose 506 that may be connected to the upstream end 190 of cyclone air inlet 184. In this configuration, the upstream, inlet end 508 of hose 506 may provide a second, auxiliary dirty air inlet that is fluidly connected to the cyclone bin assembly 160 and suction motor 162. When not in use, the hose 506 may be detached and stored separately, or optionally collapsed and stored in the storage compartment 109.

As exemplified in FIG. 7, the portable cleaning unit may also include a pre-motor filter chamber 280 that houses a pre-motor filter 282. An advantage of this design is that the pre-motor filter chamber is removable with the portable cleaning unit 500. The pre-motor filter may be provided at any location. As exemplified, the pre-motor filter 282 and the pre-motor filter chamber 280 may be positioned between the cyclone chamber air outlet 186 and the suction motor air inlet 246. In such an embodiment, the air exiting the cyclone chamber 164 may travel in a generally linear direction to the suction motor 162 while still passing through the pre-motor filter. In accordance with a further feature, the pre-motor filter chamber may comprise the air flow path between the cyclone chamber and the suction motor. Accordingly, no additional air flow conduit may be required or, alternately, the length of any such additional air flow conduit may be reduced.

For example, as exemplified in FIG. 7, the pre-motor filter chamber 280 may be positioned adjacent the air outlet 186 of the cyclone chamber 164, such that when the cyclone bin assembly 160 is mounted on the surface cleaning head 102, the pre-motor filter chamber 280 is positioned, preferably transversely, between the cyclone chamber 164 and the suction motor 162.

Optionally, as exemplified, the pre-motor filter chamber 280 is opened when the cyclone bin assembly 160 is separated from the housing portion 504. For example, as shown in FIG. 9, separating the cyclone bin assembly 160 unseals one end of the pre-motor filter chamber 280 and reveals the pre-motor filter 282 positioned therein. As exemplified, the upstream face 294 of the pre-motor filter 282 (through which air enters the pre-motor filter) is exposed when the cyclone bin assembly 160 is removed. Accordingly, when a user removes the cyclone bin assembly 160 to empty the dirt collection chamber, the user may also check the condition of the pre-motor filter (e.g., by looking at the pre-motor filter if part or all of the pre-motor filter chamber is transparent) or by opening the pre-motor filter chamber and inspecting the pre-motor filter. Preferably, the pre-motor filter 282 remains in place when the cyclone bin assembly 160 is removed, as shown in FIG. 9. Alternately, the pre-motor filter 282 may be removed with the cyclone bin assembly 160.

The cyclone bin assembly 160 and/or a pre-motor filter housing may be releasably attached to the housing 504 or other portion of the portable cleaning unit 500 using any suitable mechanism, including releasable latches, locks, clips and the like. As exemplified in FIG. 9, the portable cleaning unit 500 may include a support structure 516 extending from the housing portion 504. The cyclone bin assembly 160 includes a locking mechanism having a first latch portion 519 (FIG. 7) that may engage a corresponding notch 518 on the support structure 516. When the cyclone bin assembly 160 is attached, the lower door 267 seats on and seals the upper end of the housing portion 504, and the upper door 266 is locked to the support structure 516. To release the cyclone bin assembly 160, a user may depress an unlocking actuator in the form of a button 520 provided on the handle 510. Depressing the button 250 may disengage the latch portion from the notch 518, thereby releasing the cyclone bin assembly 160.

Alternatively, instead of providing a support structure, the cyclone bin assembly 160 may be locked directly to the housing portion 504.

Portable Cleaning Unit Mounting Portion

The following is a description of a mounting portion of the surface cleaning apparatus that may be used to removably receive and support the portable cleaning unit. The mounting portion may have various features, any or all of which may be used (individually or in any combination or sub-combination) in any surface cleaning apparatus or in any combination or sub-combination with any other feature or features disclosed herein.

To accommodate the portable cleaning unit 500, the surface cleaning head 102 may be provided with any suitable mounting portion. Preferably, the mounting portion is configured to at least partially receive the portable cleaning unit 500, and optionally may receive all or substantially all of the cleaning unit. This may help reduce the overall size of the cleaning head 102 while the portable cleaning unit 500 is attached.

Referring to FIGS. 8 and 9, in the illustrated example, surface cleaning head 102 includes a mounting portion in the form of a cavity 161 for removably receiving portable cleaning unit 500. The cavity 161 is sized to receive at least a portion of portable cleaning unit 500 and, in the example illustrated, has a generally open top. This allows portions of the portable cleaning unit 500 to remain visible when portable cleaning unit 500 is mounted in cavity 161. This can also allow a user to access the portable cleaning unit 500 without having to open or remove a separate cover panel or lid. The absence of a cover panel may help reduce the overall weight of surface cleaning apparatus 100, and may simplify the portable cleaning unit 500 removal process.

As exemplified, the cavity 161 is a generally open-topped, U—shaped recess that is provided in the upper surface 128 of the surface cleaning head 102. The cavity 161 may be configured to allow the portable cleaning unit 500 to be inserted and removed from the cavity 161 in a generally upwardly/downwardly motion, whether by lifting the portable cleaning unit 500 vertically or by pivoting the portable cleaning unit 500, such as on a cradle 360 as described herein.

As exemplified, the cavity 161 includes a front wall 522 and an opposing rear wall 524 (FIG. 9). The cradle 360 may be located at one side of the cavity 161 and a sidewall 526 may be provided at the opposing side. Together, the walls of the cavity 161 may partially surround the portable cleaning unit 500 and held keep it in place when in the floor cleaning position. Optionally, the cavity 161 may be sized such that at least 25% of the portable cleaning unit 500 is contained within the cavity 161 when in the floor cleaning position. In some configurations, at least 50%, at least 60%, at least 70%, at least 75%, at least 80%, at least 85%, at least 90% and/or at least 95% of the portable cleaning unit 500 may be positioned within the cavity 161 when in the floor cleaning position. Increasing the amount of the portable cleaning unit 500 that is positioned within the cavity 161 may help retain the portable cleaning unit 500 within the cavity 161 when the apparatus 100 is in use. Optionally, the entire (i.e. 100%) of the portable cleaning unit 500 may be positioned within the cavity 161 in some embodiments.

When the portable cleaning unit 500 is mounted to the surface cleaning head 102 in a floor cleaning position, the portable cleaning unit 500 preferably does not extend beyond upper surface 128 and/or side faces 124 of the surface cleaning head 102. This can help reduce the overall size of the surface cleaning head 102 in the floor cleaning position.

Optionally, portable cleaning unit 500 may be configured to partially surround and/or nest with other portions of the surface cleaning head 102 when in the floor cleaning position. This may help reduce the overall size of the surface cleaning head 102. For example, in the present embodiment the portable cleaning unit 500 partially nests with the brush motor 214, and its respective housing, as shown in FIG. 7. In this configuration, the brush motor 214 is positioned forward of the suction motor 162, and is laterally offset (to the left as illustrated) from the pre-motor filter chamber 280 and the cyclone bin assembly 160. In this configuration, the cyclone bin assembly 160 may have a larger depth in the forward/rearward direction than if it were positioned rearward of the brush motor 214.

Portable Cleaning Unit Removal Position

The following is a description of an optional feature of the teachings disclosed herein, in which the portable cleaning may can be moved from a floor cleaning position to a removal position, in which the portable cleaning unit is no longer in air flow communication with the surface cleaning head but remains physically supported by the surface cleaning head. The removal position may be any suitable position and may have various features, any or all of which may be used (individually or in any combination or sub-combination) in any surface cleaning apparatus or in any combination or sub-combination with any other feature or features disclosed herein. Alternatively, a surface cleaning apparatus may be configured having some of the advantages and features described herein (such as a removable portable cleaning unit) but need not be configured to provide a removal position. Instead, the portable cleaning unit may be moved directly from the floor cleaning position to an above floor cleaning position without being temporarily held in a removal position (e.g., the portable cleaning unit may be merely lifted out of the surface cleaning head by a user).

As mentioned herein, preferably the portable cleaning unit 500 is removable from the cavity 161 on the surface cleaning head 102. Preferably, to help facilitate removal of the cyclone bin assembly 160, the cyclone bin assembly 160 may be movable from a use or floor cleaning position (for example FIGS. 1-7) to a removal position (for example FIGS. 8 and 9). In the floor cleaning position, the portable cleaning unit 500 may provide the air flow connection between the dirty air inlet 110 and the suction motor 162, and ultimately the clean air outlet 112. In the removal position, the portable cleaning unit 500 is positioned so that air flow communication between the dirty air inlet 110 and the suction motor 162 is interrupted. In this configuration, the cyclone bin assembly 160 is positioned to enable a user to remove the cyclone bin assembly 160 from the surface cleaning head for emptying and optionally to remove the entire portable cleaning unit 500 for above floor cleaning.

For example, when the in the floor cleaning position, the upstream end 190 of the cyclone air inlet 184 may be in air flow communication with the air outlet 192 of the brush chamber 130. In this configuration, the surface cleaning apparatus 100 is useable to clean the floor. In contrast, when the portable cleaning unit 500 is moved to the removal position, air flow communication between the cyclone bin assembly 160 and the brush chamber 130 is interrupted.

Preferably, when in the removal position, the portable cleaning unit 500 may continue to be at least partially, and preferably entirely, supported by the surface cleaning head 102. This may allow a user to move the portable cleaning unit 500 into the removal position without having to lift or remove the portable cleaning unit 500 or support its weight.

In accordance with one feature, the portable cleaning unit 500 may be moved relative to the surface cleaning apparatus when transitioning from the floor cleaning position to the removal position. For example, the portable cleaning unit 500 may translate, pivot, rotate or otherwise move relative to other portions of the surface cleaning apparatus (such as the surface cleaning head 102) when transitioning from the floor cleaning position to the removal position. Moving the portable cleaning unit 500 and/or changing its orientation when transitioning from the floor cleaning position to the removal position may help position the portable cleaning unit 500 and/or cyclone bin assembly 160 in a position that is relatively easier to access for a user. For example, when the portable cleaning unit 500 is in the floor cleaning position it may be substantially or fully nested within the cavity 161 on the surface cleaning head 102 and may be disposed relatively close to the ground. It may be inconvenient or uncomfortable for a user to reach all the way down to the surface cleaning head 102 to grasp the portable cleaning unit 500.

In accordance with another feature, the surface cleaning apparatus 100 may be configured so that when the portable cleaning unit 500 is transitioned to the removal position it is arranged in a position that is more convenient for a user to reach it, including, for example, by moving some or all portions of the portable cleaning unit 500 to higher elevations and/or by exposing features (such as handles) that are exposed for access by a user in the removal position and are less exposed, or inaccessible, when in the floor cleaning position.

In accordance with another feature, the portable cleaning unit 500 may be biased toward or into one or both of the floor cleaning position and the removal position. Preferably, the portable cleaning unit 500 is at least biased toward the removal position. Accordingly, when a lock that secures the portable cleaning unit 500 in the use position is released, the portable cleaning unit 500 may be moved sufficiently out of the cavity 161 to assist a user to pick up and remove the portable cleaning unit 500 from the surface cleaning head.

To help facilitate access and removal of the portable cleaning unit 500, in the illustrated example the portable cleaning unit 500 can be rotated, relative to the surface cleaning head 102, into in the removal position (FIG. 8). To help support the portable cleaning unit 500 and facilitate its movement, the surface cleaning apparatus 100 may include a moveable support or platform member that at least partially supports, and may fully support, the portable cleaning unit 500 in the removal position. Preferably, the portable cleaning unit 500 may be mounted to and supported by (e.g., locked to) the movable platform member, such that movement of the moveable platform results in a corresponding movement of the cyclone bin assembly.

As exemplified in FIGS. 8-10, the surface cleaning head may include a movably mounted platform in the form of the cradle 360 that is configured to removably receive and support the laterally outer end of the portable cleaning unit 500, and is rotatable relative to the surface cleaning head about a cradle axis 362 (FIG. 10). In the illustrated example, the cradle axis 362 is parallel to the forward direction 106 of travel of the surface cleaning apparatus 100, and is generally orthogonal to the cyclone axis 174, suction motor axis 182 and brush motor axis 224 (FIG. 7).

Figure 11:
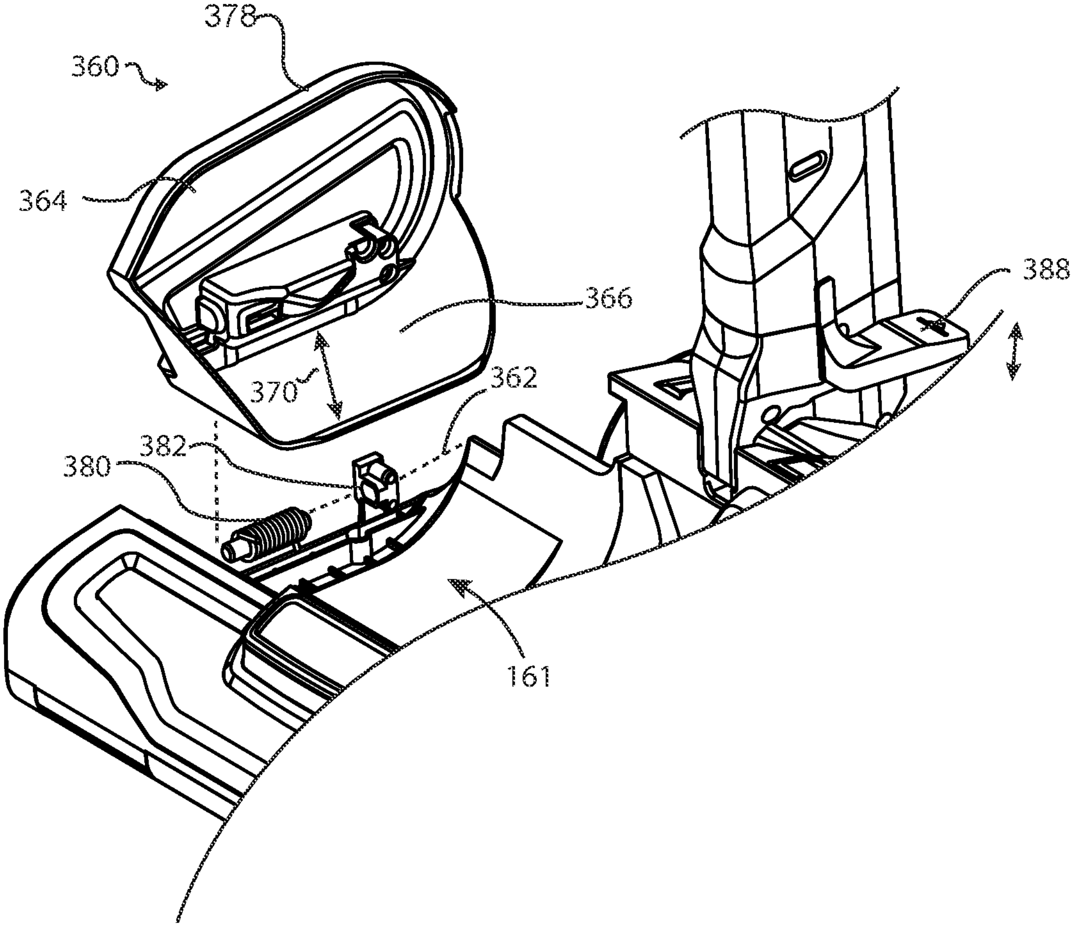

As exemplified in FIG. 11, the cradle 360 may be generally L-shaped and includes an end wall 364 and a sidewall 366 extending from the end wall 364 (see also FIG. 5) by a length 370. The length 370 is preferably selected to be less than the length 528 of the housing portion 504 of the portable cleaning unit 500. In this configuration, the cyclone bin assembly 160 is spaced apart from the sidewall 366, which may help facilitate removal of the cyclone bin assembly 160 while the housing portion 504 is seated in the cradle 360.

The end wall 364 maybe configured to receive the laterally outer end of the portable cleaning unit 500 in a relatively snug engagement. As exemplified, the end wall 364 may include an upstanding rim 368 (FIG. 5) that surrounds the housing portion 504 of the portable cleaning unit and helps retain the portable cleaning unit 500 on the cradle 360 when in the removal position.

When the portable cleaning unit 500 is in the floor cleaning position, the cradle 360 is rotated so that the end wall 364 is generally horizontal and is disposed vertically between the housing portion 504 and a bottom surface of the cavity 161. In this configuration the end wall 364 of the cradle 360 is generally vertical. When the portable cleaning unit 500 is in the floor cleaning position, an upper portion 378 (FIG. 11) of the rim 368 helps inhibit vertical movement of the portable cleaning unit 500 relative to the cradle 360, and the rest of the surface cleaning head 102.

In the illustrated example, rotation of the cradle 360 about its axis 362 causes a corresponding rotation of the portable cleaning unit 500 from the generally horizontal floor cleaning position to a generally upright removal position. Referring to FIG. 10, from the removal position, the portable cleaning unit 500 may be lifted upwardly out of the cradle 360 for above floor cleaning use.

Optionally, the cradle may be freely moveable between the cleaning and removal positions, or alternatively it may be biased. For example, in the illustrated example, a torsion spring 380 (FIG. 11) and an optional dampener assembly may connected to the cradle 360 to bias the cradle 360 toward the removal position. The torsion spring resistance may be selected so that it is sufficient to pivot the cradle 360 and portable cleaning unit 500, including the weight of the debris within the dirt collection chamber 166, to the upright removal position. The damper assembly may be provided to help slow the rotation of the cradle 360 as the portable cleaning unit 500 approaches the removal position. An example of a suitable mechanism and related structure is the mechanism, including torsion springs and damper assemblies, used in association with the cradle and movable cyclone bin assembly disclosed in U.S. application Ser. No. 14/573,549 (Conrad), the entirety of which is incorporated herein by reference.

As exemplified in, the cradle 360 may be only biased toward the removal position. To return the portable cleaning unit 500 to the floor cleaning position a user may reseat the laterally outer end of the portable cleaning unit 500 onto the end wall 364 of the cradle 360, and then pivot the portable cleaning unit 500 into the cavity 161.

In accordance with another feature, the portable cleaning unit 500 may be securable in one or both of the cleaning and removal positions using a lock. The lock may be any suitable apparatus, and optionally may be configured to lock the portable cleaning unit 500 in the floor cleaning position until the lock is released. Preferably, the lock may be automatically re-engaged when the portable cleaning unit 500 is moved into the floor cleaning position so that the portable cleaning unit 500 will be held in place without requiring a user to manually re-latch or reengage the lock. The lock may be configured to engage one or both of the cradle and the portable cleaning unit 500, or any other suitable component of the surface cleaning apparatus.

For example, a latch on the surface cleaning head 102 may be configured to engage a corresponding latch member provided on the outer surface of the portable cleaning unit 500. When the portable cleaning unit 500 is placed in the cavity 161, the latch portions may interlock with each other, thereby securing the portable cleaning unit 500. To release the portable cleaning unit 500, an actuator, such as the foot pedal 388 (FIG. 1 or 11) may be depressed by a user. The foot pedal 388 may be linked to the latch member on the surface cleaning head 102, such that depressing the foot pedal 388 disengages the latch members from each other thereby releasing the portable cleaning unit 500. One example of a suitable locking mechanism and related structure is the locking mechanism used in association with the cradle and movable cyclone bin assembly disclosed in U.S. application Ser. No. 14/573,549 (Conrad), the entirety of which is incorporated herein by reference.

Portable Cleaning Unit Carry Handle

The following is a description of an optional feature of the teachings disclosed herein, in which the portable cleaning unit includes a carry handle. The carry handle may be of any suitable configuration and may have various features, any or all of which may be used (individually or in any combination or sub-combination) in any surface cleaning apparatus or in any combination or sub-combination with any other feature or features disclosed herein. In some embodiments, the carry handle may be at least partially nested within the surface cleaning head, or otherwise inaccessible, when the portable cleaning unit is in the floor cleaning position, and may be moved to a second position where the carry handle is more exposed for grasping by a user when the portable cleaning unit is not in the floor cleaning position.

Optionally, the portable cleaning unit 500 may include a carry handle that can be used to maneuver the portable cleaning unit 500 when it is detached from the surface cleaning head 102. The carry handle may be provided on any suitable portion of the portable cleaning unit 500, including, for example, on the cyclone bin assembly 160, and may be of any configuration. Providing the carry handle on the cyclone bin assembly 160 may allow the carry handle to be used to maneuver the entire portable cleaning unit 500 when the cyclone bin assembly 160 is connected to the housing 504, and to maneuver only the cyclone bin assembly 160 when it is separated from the housing 504. As exemplified in FIGS. 8-10, the portable cleaning unit 500 may include a carry handle 510 that is provided on, and is movable with, the openable door 266 at the end of the cyclone bin assembly 160. The carry handle 510 may include hand grip portion 512 that is graspable by a user.

In accordance with one feature, the portable cleaning unit carry handle, such as handle 510, may be recessed within the surface cleaning head 102 when the portable cleaning unit is in the floor cleaning position (FIG. 1) and may be exposed and/or made more readily available when the portable cleaning unit 500 is in a removal position (FIGS. 8-10). The handle portion 510 may help increase the overall height of the portable cleaning unit 500 in the removal position, and preferably may form an uppermost portion of the portable cleaning unit 500 while it is in the removal position. Providing a handle 510 at a relatively high, and optionally uppermost position on the portable cleaning unit 500 may help position the handle 510 at an elevation that is relatively comfortable, or is more comfortable, for a user to reach (e.g. to help minimize the amount of bending required by the user).

Optionally, the portable cleaning unit 500 may be configured so that the portable cleaning unit 500, including the handle 510, extends across most or all of the entire width 338 (FIG. 5) of the surface cleaning head 102. That is, a length 514 of the portable cleaning unit 500 (FIG. 10) may be selected so that it is equal to or less than the width 338 of the surface cleaning head 102. Optionally, the length of the portable cleaning unit 500, including the handle portion 510 may be between about 60% and about 100% of the width 338 of the surface cleaning head 102, and preferably can be between about 70% and about 100% and more preferably can be between about 80% and about 100% of the width 338. In the illustrated example, the length 514 of the portable cleaning unit 500 is generally equal to the width 338 of the surface cleaning head 102. Configuring the portable cleaning unit 500 to extend the width 338 of the surface cleaning apparatus may help increase the size of, e.g., the dirt collection region of the portable cleaning unit 500, while remaining within the width 338 of the surface cleaning head 102 when in the floor cleaning position.

In accordance with another feature, the handle 510 may be configured to be positioned at an upper portion of the cyclone bin assembly when the cyclone bin assembly is in the removal position and (as exemplified in FIG. 28) may extend upwardly when the cyclone bin assembly is in the removal position.

It will be appreciated that some of the embodiments disclosed herein may not use all or any of the features of the dirt collection chamber disclosed herein and that, in those embodiments, any dirt collection chamber known in the art may be used.

Electrical Cord

The following is a description of an electrical cord that may be used by itself in any surface cleaning apparatus or in any combination or sub-combination with any other feature or features disclosed herein.

In accordance with one aspect, power may be supplied to the surface cleaning apparatus using the electrical cord. In the illustrated examples, AC power is supplied to the surface cleaning apparatus using an electrical cord that may be connected to a wall socket. The cord may be connected to the apparatus at any suitable location, including, for example on the surface cleaning head itself, or on the upper portion 104. If connected to the upper section, the cord attachment point may be toward an upper end of the upper section (e.g., generally adjacent the hand grip portion 105), and one or more electrical conductors may extend from the cord attachment point to the surface cleaning head. The electrical conductors may be external and/or internal the upper section. Optionally, the electrical conductors may be adjustable, and preferably may be extensible and/or resilient (e.g. a coiled electrical cord) so that the electrical conductors may accommodate changes in length of the upper portion (e.g., if the upper portion is a telescoping handle) without requiring decoupling or reconfiguration, and without interrupting electrical supply to the surface cleaning head.

In accordance with one feature, the electrical cord may be connected to an upper portion of the drive handle 107, such as the upper end of the upper section, e.g., on or adjacent and slightly beneath the hand grip 105. Connecting the electrical cord on an upper portion of the drive handle, such as adjacent the hand grip may help reduce the likelihood that the cord will interfere with the movement of the surface cleaning head. This positioning may also help make it convenient for a user to hold a portion of the cord with his/her free hand (i.e. the hand that is not holding the hand grip 105) and to manipulate the cord to help prevent entanglement or other impediments to the vacuuming process. Spacing the electrical cord attachment point away from the surface cleaning head may also help reduce the need to move the electrical cord when the surface cleaning head is in close proximity to and/or is beneath furniture or other objects. This may help reduce the chances of the electrical cord becoming tangled or snagged while the surface cleaning apparatus is in use.

In accordance with another feature, the electrical cord may be detachably connected to the surface cleaning apparatus. This may allow the cord to be detached for storage, or for an alternative or replacement cord to be connected to the apparatus. This may also allow the cord to be detached when not needed, such as if the surface cleaning apparatus is being powered by an alternative power source.

Alternatively, as in the example illustrated in FIG. 1, an electrical cord 502 may be directly connected to the portable cleaning unit 500. The cord 502 may be used to power the portable cleaning unit 500 when in the floor cleaning configuration (FIG. 1) and it may be detachable from the rest of the apparatus 100 with the portable cleaning unit 500 so as to also be used when in the above floor cleaning configuration (FIG. 10).

Optionally, a power cord 502 may be detachably connected to the upper portion of drive shaft 107, shown using dashed lines in FIG. 1, to power the apparatus 100 when in the floor cleaning mode. The same or an alternate power cord may be detachably connected to the portable cleaning unit 500 to power the portable cleaning unit 500 when in the above floor cleaning mode. Such a power cord 502 may be the same cord 502 that was connected to the portable cleaning unit 500 (i.e. it can be detached from the portable cleaning unit 500 and attached to the upper portion 104, and vice versa). Alternatively, a second cord 502 can be provided, and the cord 502 connected to the portable cleaning unit 500 may be reeled in, stowed, removed and the like when the apparatus 100 is operated in the floor cleaning configuration. In some embodiments, the cord connected to the portable cleaning unit 500 may be the only cord required, and a cord need not be connected to the upper portion 104 in the floor cleaning configuration.

It will be appreciated that some of the embodiments disclosed herein may not use any of the features of the electrical cord disclosed herein and that, in those embodiments, the electrical cord may be of various constructions or a detachable electrical cord may not be used.

Cordless Mode

The following is a description of a cordless operating mode that may be used by itself in any surface cleaning apparatus or in any combination or sub-combination with any other feature or features disclosed herein.

Optionally, the surface cleaning apparatus may include one or more portable energy storage devices, such as one or more batteries. The onboard battery may be a DC power source. Providing an onboard portable energy storage device may allow the surface cleaning apparatus to be operated in a cordless mode, in which the surface cleaning apparatus may be powered by the onboard energy storage device and need not be plugged into a wall socket.

Optionally, when operated on DC battery power, as opposed to external AC power, the rotating brush motor and/or the suction motor may operate at a reduced rate or may be otherwise configured to reduce power consumption (e.g., the motor may have dual windings to be operable on both AC and DC power). If required, a converter module may be provided to convert the external power supply (e.g. AC) into a format (e.g., DC) that is compatible with the motor, configured to re-charge the batteries, or is otherwise preferred over the native incoming format.

The battery may be any suitable type of battery, including a rechargeable battery. Optionally, when the surface cleaning apparatus is electrically connected to an AC power source (e.g., a wall socket), power from the AC source may be used to re-charge the battery, to directly power/drive the suction motor and/or rotating brush motor, or to simultaneously run the suction motor and/or brush motor and re-charge the battery. In this configuration, when the surface cleaning apparatus is operated while coupled to an AC power source, the battery in the cleaning head may be charged and the suction motor and brush motor may be driven by AC power and/or a combination of AC and battery power. Then, when the surface cleaning apparatus is electrically decoupled from the AC power source, the surface cleaning apparatus can be operated on battery power alone.

Alternatively, or in addition to positioning a battery in the surface cleaning head, one or more batteries may be provided within the upper portion and electrically connected to the suction motor and/or other components in the surface cleaning head. Providing at least some batteries in the upper portion may provide extra space to accommodate the batteries, as compared to the space limitations within the surface cleaning head. Positioning batteries in the upper portion may also alter the weight distribution of the surface cleaning apparatus, which may alter the "feel" of the apparatus in a user's hand. In embodiments where the electrical cord is connected to the upper portion, providing batteries within the upper portion may help facilitate the use of a convenient electrical connection between the incoming power from the electrical cord and the batteries and/or charging equipment. This may help reduce the need to run multiple electrical conductors between the upper portion and the surface cleaning head.

It will be appreciated that some of the embodiments disclosed herein may not use any of the features of the cordless mode disclosed herein and that, in those embodiments, the cordless mode may be of other designs or a cordless mode may not be used.

As exemplified, the apparatus 100 may include a battery pack 111 on the upper portion 104 that may provide power when in the floor cleaning configuration. Alternately or in addition, a secondary battery pack 111 may optionally be provided in the portable cleaning unit 500, such as within the support structure 516 (see FIG. 9) and or in the handle 510 (see FIG. 7), to power the suction motor 162 when the portable cleaning unit 500 is installed in and separated from, or only when installed in, the surface cleaning head 102. The battery pack 530 is shown schematically using dashed lines as one example of a possible placement (within the handle 510) and may be electrically connected to the suction motor 162 using any suitable internal wiring.

In one embodiment, an on board power source may be provided as part of portable cleaning unit 500 and the power cord 502 may be provided at any location on surface cleaning apparatus 100, such as upper portion 104. In the floor cleaning configuration, the surface cleaning apparatus may be operated on power provided by the power cord 502. In the above floor cleaning configuration, the portable cleaning unit may be powered by the on board power source (e.g., the batteries). The on board power source may be recharged when the portable cleaning unit is mounted to the surface cleaning head. Optionally, the power cord 502 may be used to operate the portable cleaning unit 500 when in the above floor cleaning configuration. For example, if the power cord 502 is detachable, the portable cleaning unit may be operated without the power cord attached when in the above floor cleaning configuration. If the on board power source are exhausted when the user still desires to perform above floor cleaning, the power cord 502 may be attached to the portable cleaning unit 500 and the user may continue to perform above floor cleaning.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An all in the head surface cleaning apparatus comprising:

(a) a surface cleaning head having a surface cleaning head a dirty air inlet;

(b) an upper portion moveably mounted to the surface cleaning head between a storage position and a floor cleaning position, the upper portion comprising a drive handle; and, (c) a portable cleaning unit removably mounted to the surface cleaning head, the portable cleaning unit comprising:

(i) an air treatment member assembly comprising an air treatment member wherein the air treatment member is removably mounted to the portable cleaning unit;

(ii) a suction motor having a suction motor axis; and, (iii) a clean air outlet downstream from the suction motor, wherein the all in the head surface cleaning apparatus is operable in a floor cleaning mode in which the portable cleaning unit is provided as part of the surface cleaning head, and wherein, in the floor cleaning mode, the all in the head surface cleaning apparatus comprises an air flow path that extends between the surface cleaning head dirty air inlet and the clean air outlet and the air treatment member and the suction motor are part of the air flow path, and wherein the portable cleaning unit is useable in an above floor cleaning mode in which the portable cleaning unit is removed from the surface cleaning head.

2. The apparatus of claim 1 further comprising a suction motor housing and the air treatment member assembly is removably mounted to the suction motor housing.

3. The apparatus of claim 1 further comprising a pre-motor filter and the pre-motor filter is accessible when the treatment member assembly is removed.

4. The apparatus of claim 1 further comprising a pre-motor filter and an upstream surface of the pre-motor filter is revealed when the treatment member assembly is removed.

5. The apparatus of claim 4 further comprising a main body that houses the suction motor, wherein the pre-motor filter is recessed in the main body.

6. The apparatus of claim 1 further comprising a main body that houses the suction motor, the air treatment member assembly is removably mounted to the main body, the air treatment assembly has an air outlet end and the air outlet end is mountable to the main body.

7. The apparatus of claim 1 wherein the air treatment assembly has an air outlet end and the air outlet end is openable.

8. The apparatus of claim 7 wherein the air treatment assembly has an opposed end that is spaced from and faces the openable end, and the opposed end is openable.

9. The apparatus of claim 1 wherein the air treatment assembly has an air outlet end and an opposed end that is spaced from and faces the openable end, and the opposed end is provided with a carry handle.

10. The apparatus of claim 9 wherein the opposed end is openable.

11. The apparatus of claim 10 wherein the air outlet end is openable.

12. The apparatus of claim 1 further comprising a lock, which secures the portable cleaning unit as part of the surface cleaning head, and a lock release actuator and the lock release actuator is provide don the portable cleaning unit.

13. The apparatus of claim 1 wherein the portable cleaning unit further comprises an energy storage member.

14. The apparatus of claim 1 wherein the portable cleaning unit further comprises a support structure that extends from a main body along an exterior of the air treatment assembly.

15. The apparatus of claim 14 wherein the support structure comprises a portion of the air flow path.

16. The apparatus of claim 15 wherein the support structure extends to an air inlet of an air treatment assembly.

17. The apparatus of claim 1 wherein the air treatment assembly has an air outlet, air travels in a flow direction when it exits the air outlet and the suction motor axis extends in the flow direction.

18. The apparatus of claim 1 wherein an accessory cleaning tool is removably mountable to the portable cleaning unit when the portable cleaning unit is removed from the surface cleaning head.

19. An all in the head surface cleaning apparatus comprising:

(a) a surface cleaning head having a surface cleaning head a dirty air inlet;

(b) an upper portion moveably mounted to the surface cleaning head between a storage position and a floor cleaning position, the upper portion comprising a drive handle; and, (c) a portable cleaning unit removably mounted to the surface cleaning head, the portable cleaning unit comprising:

(i) an air treatment member assembly comprising an air treatment member;

(ii) a suction motor having a suction motor axis; and, (iii) a clean air outlet downstream from the suction motor, wherein the all in the head surface cleaning apparatus is operable in a floor cleaning mode in which the portable cleaning unit is provided as part of the surface cleaning head, and wherein, in the floor cleaning mode, the all in the head surface cleaning apparatus comprises an air flow path that extends between the surface cleaning head dirty air inlet and the clean air outlet and the air treatment member and the suction motor are part of the air flow path, and wherein the portable cleaning unit is useable in an above floor cleaning mode in which the portable cleaning unit is removed from the surface cleaning head, and wherein an accessory cleaning tool is removably mountable to the portable cleaning unit when the portable cleaning unit is removed from the surface cleaning head.

20. The apparatus of claim 19 further comprising a pre-motor filter and an upstream surface of the pre-motor filter is revealed when the treatment member assembly is removed.

* * * * *